United States Patent
Agrawal et al.

(10) Patent No.: US 10,769,677 B1
(45) Date of Patent: Sep. 8, 2020

(54) TEMPORAL FEATURES IN A MESSAGING PLATFORM

(71) Applicant: Twitter, Inc., San Francisco, CA (US)

(72) Inventors: Parag Agrawal, San Francisco, CA (US); Utkarsh Srivastava, San Francisco, CA (US); Kumar Chellapilla, San Francisco, CA (US); Qicheng Ma, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 0 days.

(21) Appl. No.: 15/894,550

(22) Filed: Feb. 12, 2018

Related U.S. Application Data

(63) Continuation of application No. 15/259,927, filed on Sep. 8, 2016, now Pat. No. 9,892,431, which is a
(Continued)

(51) Int. Cl.
*G06F 7/00* (2006.01)
*G06F 16/30* (2019.01)
(Continued)

(52) U.S. Cl.
CPC ... *G06Q 30/0275* (2013.01); *G06F 16/24578* (2019.01); *G06F 16/9535* (2019.01); *H04L 51/04* (2013.01)

(58) Field of Classification Search
CPC .............. G06Q 10/10; G06Q 30/0275; G06F 17/30867; G06F 17/30864;
(Continued)

(56) References Cited

U.S. PATENT DOCUMENTS

| | | | |
|---|---|---|---|
| 6,546,378 B1 * | 4/2003 | Cook | A61B 5/04012 706/12 |
| 7,478,129 B1 | 1/2009 | Chemtob | |

(Continued)

OTHER PUBLICATIONS

Chapelle et al., "An Empirical Evaluation of Thompson Sampling," In NIPS, 2011, 9 pgs. Applicant points out, in accordance with MPEP 609.04(a), that the year of publication, 2011, is sufficiently earlier than the effective U.S. filing date, Mar. 15, 2013, so that the particular month of publication is not in issue.
(Continued)

*Primary Examiner* — Kuen S Lu
(74) *Attorney, Agent, or Firm* — Fish & Richardson P.C.

(57) ABSTRACT

A real-time messaging platform allows advertiser accounts to pay to insert candidate messages into the message streams requested by account holders. To accommodate multiple advertisers, the messaging platform controls an auction process that determines which candidate messages are selected for inclusion in a requested account holder's message stream. Selection is based on a bid for the candidate message, the message stream that is requested, and a variety of other factors that vary depending upon the implementation. The process for selection of candidate messages generally includes the following steps, though any given step may be omitted or combined into another step in a different implementation: targeting, filtering, prediction, ranking, and selection.

30 Claims, 18 Drawing Sheets

Related U.S. Application Data continuation of application No. 14/801,033, filed on Jul. 16, 2015, now Pat. No. 9,454,771, which is a continuation of application No. 14/214,523, filed on Mar. 14, 2014, now Pat. No. 9,117,227, and a continuation-in-part of application No. 13/975,515, filed on Aug. 26, 2013, now Pat. No. 9,298,812, which is a continuation of application No. 13/433,217, filed on Mar. 28, 2012, now Pat. No. 8,682,895.

(60) Provisional application No. 61/800,546, filed on Mar. 15, 2013, provisional application No. 61/470,385, filed on Mar. 31, 2011.

(51) Int. Cl.
*G06Q 30/02* (2012.01)
*H04L 12/58* (2006.01)
*G06F 16/9535* (2019.01)
*G06F 16/2457* (2019.01)

(58) Field of Classification Search
CPC ........... G06F 17/30979; G06F 16/0535; G06F 16/24578; H04L 51/04
USPC ........................................................ 707/732
See application file for complete search history.

(56) References Cited

U.S. PATENT DOCUMENTS

| | | | |
|---|---|---|---|
| 7,624,125 B2* | 11/2009 | Feinsmith | G06Q 10/10 |
| 7,805,421 B2* | 9/2010 | Grichnik | G06F 16/335 |
| | | | 707/696 |
| 7,835,939 B1 | 11/2010 | Karlsson | |
| 8,265,612 B2 | 9/2012 | Athsani et al. | |
| 8,365,138 B2 | 1/2013 | Iborra et al. | |
| 8,572,011 B1 | 10/2013 | Sculley, II | |
| 8,682,895 B1 | 3/2014 | Goel et al. | |
| 9,117,227 B1 | 8/2015 | Agrawal et al. | |
| 9,298,812 B1 | 3/2016 | Goel et al. | |
| 9,319,359 B1 | 4/2016 | Srivastava et al. | |
| 9,361,322 B1 | 6/2016 | Dutta et al. | |
| 9,454,771 B1 | 9/2016 | Agrawal et al. | |
| 9,524,321 B2 | 12/2016 | Goel et al. | |
| 9,892,431 B1 | 2/2018 | Agrawal et al. | |
| 9,892,461 B2 | 2/2018 | Keyes et al. | |
| 2002/0123928 A1 | 9/2002 | Eldering et al. | |
| 2002/0131565 A1* | 9/2002 | Scheuring | G06Q 10/109 |
| | | | 379/88.19 |
| 2003/0105677 A1 | 6/2003 | Skinner | |
| 2004/0054542 A1* | 3/2004 | Foote | G09B 5/00 |
| | | | 704/500 |
| 2005/0076046 A1 | 4/2005 | Goldsack | |
| 2005/0144065 A1 | 6/2005 | Calabria et al. | |
| 2005/0144075 A1 | 6/2005 | Magowan et al. | |
| 2005/0182773 A1* | 8/2005 | Feinsmith | G06Q 10/10 |
| 2006/0080354 A1* | 4/2006 | Berger | G06F 16/20 |
| 2006/0101351 A1 | 5/2006 | Cowham | |
| 2006/0167747 A1 | 7/2006 | Goodman et al. | |
| 2006/0282328 A1 | 12/2006 | Gerace et al. | |
| 2007/0136235 A1* | 6/2007 | Hess | G06F 16/907 |
| 2008/0065490 A1 | 3/2008 | Novick et al. | |
| 2008/0120129 A1 | 5/2008 | Seubert et al. | |
| 2008/0235084 A1* | 9/2008 | Quoc | G06Q 10/02 |
| | | | 705/14.41 |
| 2008/0243925 A1 | 10/2008 | Axe et al. | |
| 2008/0249832 A1 | 10/2008 | Richardson et al. | |
| 2009/0063249 A1 | 3/2009 | Tomlin et al. | |
| 2009/0150214 A1 | 6/2009 | Mohan | |
| 2009/0234713 A1 | 9/2009 | Bi et al. | |
| 2009/0307318 A1* | 12/2009 | Chappell | G06Q 10/109 |
| | | | 709/206 |
| 2010/0217668 A1 | 8/2010 | Liu et al. | |
| 2010/0235451 A1* | 9/2010 | Yu | G06F 15/16 |
| | | | 709/206 |
| 2011/0040751 A1* | 2/2011 | Chandrasekar | G06F 16/9537 |
| | | | 707/725 |
| 2011/0054960 A1 | 3/2011 | Bhatia et al. | |
| 2011/0103682 A1* | 5/2011 | Chidlovskii | G06K 9/6284 |
| | | | 382/159 |
| 2011/0213679 A1* | 9/2011 | Petkov | G06Q 30/02 |
| | | | 705/27.1 |
| 2011/0238487 A1 | 9/2011 | Chang et al. | |
| 2011/0288935 A1 | 11/2011 | Elvekrog et al. | |
| 2012/0084288 A1 | 4/2012 | Abdul-Razzak et al. | |
| 2012/0136722 A1 | 5/2012 | Kothiwal et al. | |
| 2012/0233009 A1 | 9/2012 | Fougner et al. | |
| 2012/0259919 A1 | 10/2012 | Yan et al. | |
| 2013/0030913 A1 | 1/2013 | Zhu et al. | |
| 2013/0031090 A1 | 1/2013 | Posse et al. | |
| 2013/0046826 A1 | 2/2013 | Stanton | |
| 2013/0097102 A1 | 4/2013 | Revesz | |
| 2013/0110641 A1 | 5/2013 | Ormont et al. | |
| 2013/0110649 A1 | 5/2013 | Sugiura et al. | |
| 2013/0124308 A1 | 5/2013 | Hegeman et al. | |
| 2013/0139048 A1 | 5/2013 | Dhawan et al. | |
| 2013/0151539 A1 | 6/2013 | Shi et al. | |
| 2013/0297706 A1 | 11/2013 | Arme et al. | |
| 2013/0317910 A1 | 11/2013 | Mohamed | |
| 2013/0325755 A1 | 12/2013 | Arquette et al. | |
| 2013/0346182 A1 | 12/2013 | Cheng et al. | |
| 2014/0006414 A1 | 1/2014 | Oikonomou | |
| 2014/0019261 A1 | 1/2014 | Hegeman et al. | |
| 2014/0068011 A1 | 3/2014 | Zhang et al. | |
| 2014/0195549 A1 | 7/2014 | Ahn et al. | |
| 2014/0244386 A1 | 8/2014 | Mathur | |
| 2014/0278981 A1 | 9/2014 | Mersov et al. | |
| 2014/0351030 A1 | 11/2014 | Priebatsch | |

OTHER PUBLICATIONS

Conroy et al., "Measuring Twitter User Similarity as a Function of Strength of Ties," Proceedings of the International Conference on Knowledge Discovery and Information Retrieval (KDIR-2011), Oct. 26-29, 2011, 9 pp.

Thompson, "On the likelihood that one unknown probability exceeds another in view of the evidence of two samples," Biometrika, vol. 25, No. 3/4, Dec. 1933, pp. 285-294.

Underwood, "Gender targeting for Promoted Products now available," business.twitter.com, Twitter, Inc., Oct. 25, 2012, 4 pgs.

Prosecution History from U.S. Pat. No. 8,682,895, dated Mar. 21, 2013 through Nov. 27, 2013, 60 pp.

Prosecution History from U.S. Pat. No. 9,298,812, dated Sep. 17, 2014 through Nov. 20, 2015, 75 pp.

Prosecution History from U.S. Pat. No. 9,117,227, dated Apr. 29, 2015 through Jul. 1, 2015, 17 pp.

Prosecution History from U.S. Appl. No. 14/801,033, dated Jul. 16, 2015 through May 26, 2016, 22 pp.

Prosecution History from U.S. Appl. No. 15/259,924, dated May 26, 2017 through Jan. 17, 2018, 45 pp.

U.S. Appl. No. 14/214,495, filed Mar. 14, 2014, naming inventors Andersen et al.

U.S. Appl. No. 14/214,466, filed Mar. 14, 2014, naming inventors Andersen et al.

U.S. Appl. No. 14/214,427, filed Mar. 14, 2014, naming inventors Andersen et al.

U.S. Appl. No. 14/214,438, filed Mar. 14, 2014, naming inventors Agrawal et al.

U.S. Appl. No. 14/214,420, filed Mar. 14, 2014, naming inventors Andersen et al.

U.S. Appl. No. 14/214,489, filed Mar. 14, 2014, naming inventors Agrawal et al.

U.S. Appl. No. 14/214,498, filed Mar. 14, 2014, naming inventors Andersen et al.

U.S. Appl. No. 16/200,582, filed Nov. 26, 2018.

U.S. Appl. No. 16/372,250, filed Apr. 4, 2019.

U.S. Appl. No. 14/214,420, filed Mar. 14, 2014, Reid Anderson.

(56) References Cited

OTHER PUBLICATIONS

U.S. Appl. No. 14/214,427, filed Mar. 14, 2014, Reid Anderson.
U.S. Appl. No. 14/214,466, filed Mar. 14, 2014, Reid Anderson.
U.S. Appl. No. 14/214,489, filed Mar. 14, 2014, Parag Agrawal.
U.S. Appl. No. 14/214,495, filed Mar. 14, 2014, Reid Anderson.
U.S. Appl. No. 14/214,498, filed Mar. 14, 2014, Reid Anderson.
Agarwal et al., "Machine Learning in Online Advertising," 24th Annual Conference on Neural Information Processing Systems, Dec. 10, 2010, 57 pages.
Karande et al., "Optimizing Budget Constrained Spend in Search Advertising," Proceedings of the Sixth ACM International Conference on Web Search and Data Mining, Feb. 4-8, 2013, 10 pages.

\* cited by examiner

| | Status | End Date | Budget | Spent | Left | Pacing | CSV |
|---|---|---|---|---|---|---|---|
| All Funding Instruments | | | | | | | |
| One-Time Funding Sources | | | | | | | |
| ☐ Coffee Bar – Fall 2013 | EXPIRED | 31 Dec 2013 | $5,000 | $3,447 | $1,663 | 69% | ⊥Spend |
| ☐ Coffee Bar – Summer 2013 | EXPIRED | 30 Sept 2013 | $15,000 | $2,400 | $12,600 | 16% | ⊥Spend |

FIG. 7C

TEMPORAL FEATURES IN A MESSAGING PLATFORM

CROSS REFERENCE TO RELATED APPLICATIONS

This application is a continuation of U.S. Non-Provisional application Ser. No. 15/259,924, filed Sep. 8, 2016, now U.S. Pat. No. 9,892,431, which is a continuation of U.S. Non-Provisional application Ser. No. 14/801,033, filed Jul. 16, 2015, now U.S. Pat. No. 9,454,771, which is a continuation of U.S. Non-Provisional application Ser. No. 14/214,523, filed Mar. 14, 2014, now U.S. Pat. No. 9,117,227, which claims the benefit of U.S. Provisional Application No. 61/800,546, filed Mar. 15, 2013, each of which is incorporated by reference herein in its entirety. U.S. Non-Provisional application Ser. No. 14/214,523, filed Mar. 14, 2014, is a continuation in part of U.S. Non-Provisional application Ser. No. 13/975,515, filed Aug. 26, 2013, now U.S. Pat. No. 9,298,812, which is a continuation of U.S. Non-Provisional application Ser. No. 13/433,217, filed Mar. 28, 2012, now U.S. Pat. No. 8,682,895, which claims priority to U.S. Provisional Application No. 61/470,385, filed Mar. 31, 2011, each of which is incorporated by reference herein in its entirety.

BACKGROUND

There are a wide range of known automatic techniques for classifying and selecting content for an Internet service. For example, with regard to textual content, there are known techniques from the areas of textual categorization, textual clustering, entity extraction, etc. that can be used to classify the different textual content. There are similar classification techniques for other types of content, such as audio and video. The classification result can then be used to determine what type of promoted content to associate with content in the Internet service. Such mechanisms have been used, for example, to insert content into a search engine page based on relevance to search keywords provided by a user.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 7C illustrates an example user interface for viewing budget and spending data of an ad campaign, according to one embodiment.

DETAILED DESCRIPTION

The Figures (FIGs.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

I. Configuration Overview

A real-time messaging platform allows account holders to author messages that are published in a customized message stream accessible via the internet. Account holders can also subscribe to the message streams of other account holders, and integrate the messages authored by the subscribed account holders into their own message stream. Further, an account holder's message stream can also include engagements within the messaging platform generated by the account holder and other account holders to which they are subscribed, or who subscribe to them. Thus, each account's message stream represents an account-specific aggregation of various types of content stored by the messaging platform. Generally, account holders may request and view the message streams of other account holders The real-time messaging platform allows advertiser accounts to pay to insert candidate messages into the message streams requested by account holders. To accommodate multiple advertisers, the messaging platform controls an auction process that determines which candidate messages are selected for inclusion in a requested account holder's message stream. Selection is based on a bid for the candidate message, the message stream that is requested, and a variety of other factors that vary depending upon the implementation. The process for selection of candidate messages generally includes the following steps, though any given step may be omitted or combined into another step in a different implementation: targeting, filtering, prediction, ranking, and selection.

Figure 1:
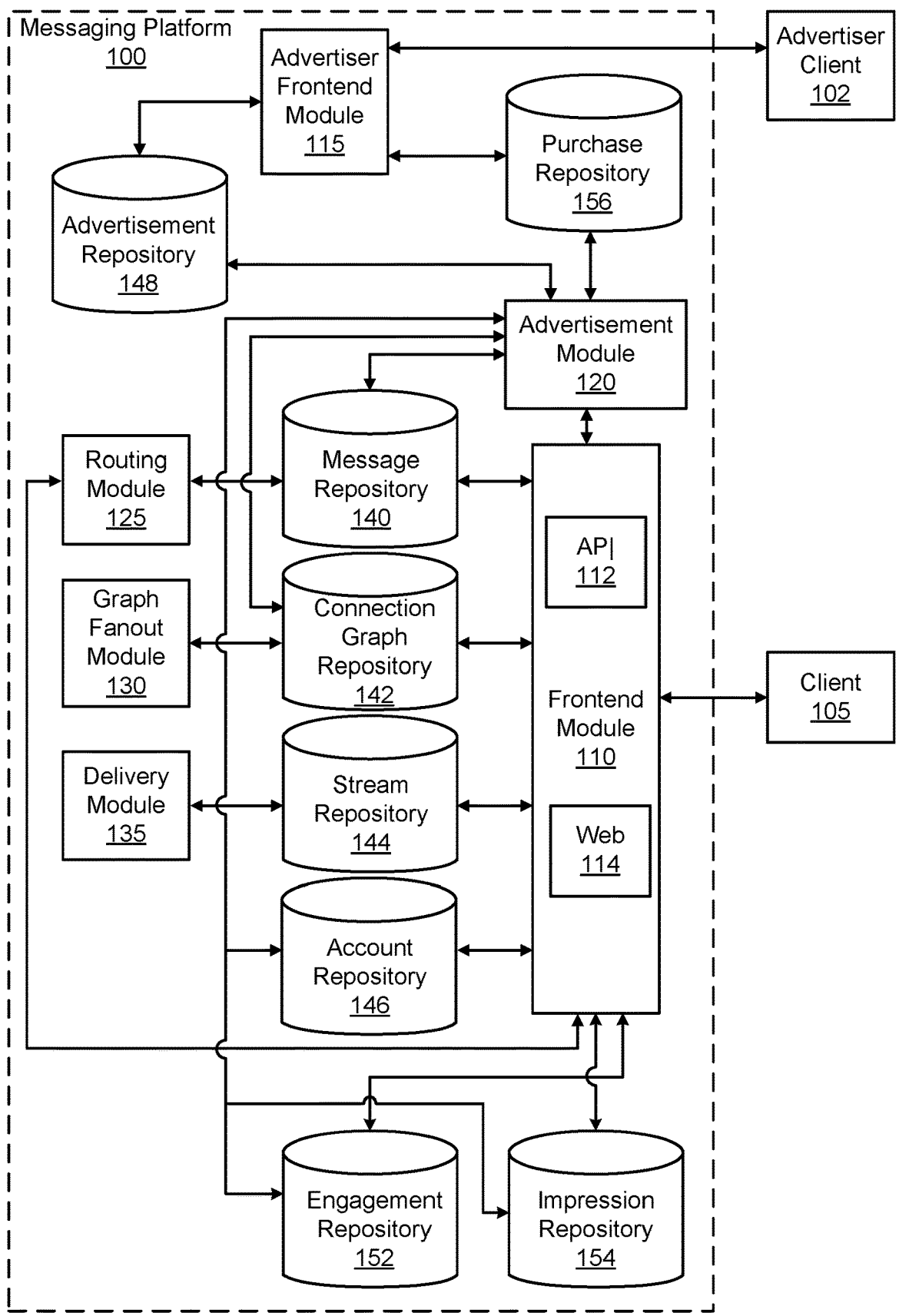
FIG. 1 is a block diagram of a real-time messaging platform, according to one embodiment.

The targeting step identifies candidate messages and/or accounts that match targeting criteria for the candidate message as set forth by the advertiser. Targeting is further described with respect to FIGS. 3A and 3B. The filtering step filters the set of candidate messages that are considered for selection, in order to reduce the processing burden on the messaging platform for the remaining prediction and ranking steps. Filtering is further described with respect to FIGS. 4A-4E. The prediction step predicts, among other things, the likelihood of engagement with each of the candidate messages by anyone viewing the requested message stream. In one embodiment, the greater the likelihood of engagement, the more likely that candidate message will be selected for inclusion in the message stream. Prediction is further described with respect to FIGS. 5A and 5B. The ranking step ranks candidate messages based on likelihood of engagement and/or based on other factors. Ranking is further described with respect to FIGS. 6A and 6B. The messaging platform also collects analytics that process data regarding interactions with the messaging platform, and provides the data to advertisers for their consumption and consideration when planning candidate messages and ad campaigns. Analytics are further described with respect to FIGS. 7A-7C. FIGS. 1 and 2 provide overviews of the modules and processes of the messaging platform. Finally, the above description of the various steps and components of the messaging platform is merely exemplary, and each step and module of the messaging platform includes possible additional or alternative tasks that may be performed by the messaging platform.

II. Real-Time Messaging Platform Overview

FIG. 1 is a block diagram of a real-time messaging platform, according to one embodiment. The messaging platform 100 includes an advertisement module 120, a routing module 125, a graph fanout module 130, a delivery module 135, various repositories 140, 142, 144, 146, 148, 152, 154, 156, a frontend module 110, and an advertiser frontend module 115. The messaging platform 100 allows account holders to create, publish, and view messages in a message stream visible to themselves and other subscribing accounts of the messaging platform 100.

Account holders compose messages using a client software application running on a client computing device 105 (also referred to as a client 105), such as a mobile phone, a personal computer (laptop, desktop, or server), or a specialized appliance having communication capability. The client software application may include a web-based client, a Short Messaging Service (SMS) interface, an instant messaging interface, an email-based interface, an API function-based interface, etc. The client computing devices 105 communicate with the messaging platform via a network such as the internet.

Messages are containers for a variety of types of computer data representing content provided by the composer of the message. Types of data that may be stored in a message include text (e.g., 140 character Tweet), graphics, video, computer code (e.g., uniform resource locators (URLs)), or other content. Messages can also include key phrases (e.g., symbols, such as hashtag "#") that can aid in categorizing or contextualizing messages. Messages may also include additional metadata that may or may not be editable by the composing account holder, depending upon the implementation. Examples of message metadata include the time and date of authorship as well as the geographical location where the message was composed (e.g., the current physical location of the client 105).

The messages composed by one account holder may also reference other accounts. For example, a message may be composed in reply to another message composed by another account holder. Messages may also be repeats (or reposts) of a message composed by another account holder. Reposts may also be referred to as "Retweets." Generally, an account referenced in a message may both appear as visible content in the message (e.g., the name of the account), and may also appear as metadata in the message. As a result, the messaging platform is able to allow the referenced accounts to be interactive. For example, clients 105 may interact with account names that appear in their message stream to navigate to the message streams of those accounts. The messaging platform 100 allows messages to be private, such that a composed message will only appear in the message streams of the composing and recipient accounts.

The frontend module 110 receives composed messages from the clients 105, interfaces with other internal components of the messaging platform 100, and distributes message streams to account holders. The frontend module 110 may provide a variety of interfaces for interacting with a number of different types of clients 105. For example, when an account holder uses a web-based client 105 to access the messaging platform 100, a web interface module 114 in the front end module 110 can be used to provide the client 105 access. Similarly, when an account holder uses an API-type client 105 to access the messaging platform 100, an API interface module 112 can be used to provide the client 105 access.

The routing module 125 stores newly composed messages received through the frontend module 110 in a message repository 140. In addition to storing the content of a message, the routing module 125 also stores an identifier for each message. This way, the message can be included in a variety of different message streams without needing to store more than one copy of the message.

The graph module 130 manages connections between account holders, thus determining which accounts receive which messages when transmitting message streams to clients 105. Generally, the messaging platform 100 uses unidirectional connections between accounts to allow account holders to subscribe to the message streams of other account holders. By using unidirectional connections, the messaging platform allows an account holder to receive the message stream of another user, without necessarily implying any sort of reciprocal relationship the other way. For example, the messaging platform 100 allows account holder A to subscribe to the message stream of account holder B, and consequently account holder A is provided and can view the messages authored by account holder B. However, this unidirectional connection of A subscribing to B does not imply that account holder B can view the messages authored by account holder A. This could be the case if account holder B subscribed to the message stream of account holder A; however, this would require the establishment of another unidirectional connection. In one embodiment, an account holder who establishes a unidirectional connection to receive another account holder's message stream is referred to as a "follower", and the act of creating the unidirectional connection is referred to as "following" another account holder. The graph module 130 receives requests to create and delete unidirectional connections between account holders through the frontend module 110. These connections are stored for later use in the connection graph repository 142 as part of a unidirectional connection graph. Each connection in the connection graph repository 142 references an account in the account repository 146.

In the same or a different embodiment, the graph module 130 manages connections between account holders using bidirectional connections between account holders. Upon establishing a bidirectional connection, both accounts are considered subscribed to each other's account message stream. The graph module stores bidirectional connections in the connection graph repository 142 as part of a social graph. In one embodiment, the messaging platform and connection graph repository 142 include both unidirectional and bidirectional connections.

The delivery module 135 constructs message streams and provides them to requesting clients 105 through the frontend module 110. Responsive to a request for a message stream of a requested account holder, the delivery module constructs a message stream in real time. This may include providing messages from subscribed account holders who are mutually connected to the messaging platform during concurrent sessions (e.g., simultaneously). However, it may also messages authored not in real time and/or via account holders that are not simultaneously connected to the messaging platform with the requesting account holder (also referred to as the contextual account holder). The contents of a message stream for a requested account holder may include messages composed by the requested account holder, messages composed by the other account holders that the requested account holder follows, messages authored by other account holders that reference the requested account holder, and in some cases advertisement messages (and more generally referred to as candidate messages, including both ad messages and other types of messages) selected by the messaging platform 100. The messages of the message stream may be ordered chronologically by time and date of authorship, or reverse chronologically. Other orderings may also be used.

There may be a large number of possible messages that might be included in the message stream. The delivery module 135 identifies a subset of the possible messages for inclusion in the message stream. For example, the delivery module 135 orders the subset of messages by time of composition or any other item of information available regarding the messages. The delivery module 135 stores the message stream in a stream repository 144. The stored message stream may include the entire contents of each of the messages in the stream, or it may include pointers that point to the location of the message in the message repository 140. The delivery module 135 provides the message stream to the requesting client 105 through the frontend module 110.

Clients 105 of the messaging platform allow account holders to engage (e.g., interact) with the messages in message streams. There are a number of different types and categories of interactions. Types of engagement include clicking/selecting a message for more information regarding the message, clicking/selecting a URL (universal resource locator) or hashtag in a message, reposting the message, or favoriting a message. Other example engagements types include expanding a "card" message, which presents additional content when an account holder engages with the card message. Account holders may engage further with content contained in the expanded card message (e.g., by playing a video or audio file or by voting in a poll).

Categories of engagements are a group of engagements types. Example categories include engagements expressing a positive sentiment about a message (positive engagements), engagements expressing a negative sentiment about a message (negative engagements), engagements that allow an advertiser to receive monetary compensation (monetizable engagements), engagements that are expected to result in additional future engagements (performance engagements), or engagements that are likely to result in one account holder following another account holder, etc. For example, the negative engagements category includes engagements such as dismissing a message or reporting a message as offensive while the positive engagements category typically includes engagements not in the negative engagements category. Example performance engagements include selecting a URL in a message or expanding a card. Example monetizable engagements include an engagement that results in an eventual purchase or an application install to the client 105. Generally, categories and types are not coextensive, and a given type of engagement may fall into more than one category, and vice versa.

The frontend module 110 tracks account holder engagements with a message through the client 105. The frontend module 110 may store these engagements in an engagement repository 152. An engagement stored in the engagement repository 152 may contain a pointer to the message repository 140, where the pointer indicates which message was involved in the engagement. Further, an engagement stored in the engagement repository 152 may also contain a pointer to the account repository 146, where the pointer indicates which account was involved in the engagement. To track engagement data, the client 105 sends feedback reports to the frontend module 110. These feedback reports include engagement data indicating the message, account, and the type and/or category of engagement. The client 105 sends feedback reports periodically, as part of an account holder request for additional messages in a message stream, or in response to an account holder engagement, for example.

In addition to monitoring active interactions (e.g., engagements) with messages through the client 105, the frontend module 110 tracks passive interactions (e.g., impressions) with messages. An impression occurs when an account holder views or otherwise experiences the content of a message through a client 105. The frontend module 110 may store known or inferred impressions in an impression repository 154. An impression stored in the impression repository 154 may contain a pointer to the message repository 140, where the pointer indicates which message received the impression. Further, an impression stored in the impression repository 154 may also contain a pointer to the account repository 146, where the pointer indicates which account was involved in the impression.

When an account holder engages with a message, an impression also occurs. However, account holders may view a message (and therefore cause an impression) without engaging with it, so the frontend module 110 may also infer an impression between an account and this message. Because impressions are a passive interaction, the frontend module 110 may have to infer impressions of messages that do not receive an engagement. For example, the frontend module 110 infers impressions for messages presented before a message that receives an engagement (for example, messages presented above an engaged message in a vertical scrolling interface).

To infer impressions, the client 105 may send the frontend module 110 additional data as part of feedback reports used to report engagements. For example, the client 105 tracks which messages have been displayed on a screen of the client. The frontend module 110 infers impressions for messages that have been displayed on a screen of a client 110 (either fully or partially). The client 105 may track the time a message is displayed, and the frontend module 110 may impose a threshold of display time for a message as a condition for inferring an impression. As another example, the client 105 presents messages using a scrolling interface and tracks where a user has scrolled. The frontend module 110 infers messages that have been received an impression based on scrolling information (e.g., messages above the farthest scroll point have received an impression). Alternatively to inferring impressions based on additional data, the frontend module 110 assumes that all messages in a message stream sent to a client have received an impression.

The frontend module 110 may estimate impressions for messages in a message stream before receiving a feedback report from the client 105. The advertisement module 120 may use these estimated impressions temporarily until impressions may be inferred more reliably for the message stream from a received feedback report. In one example method to estimate impressions for messages in a message stream, the frontend module 110 determines the average number of messages receiving impressions from an account from past impression data. By combining the average number of messages receiving impressions and the ordering of messages in the requested message stream, the frontend module 110 estimates which messages of the message stream have received an impression. The frontend module 110 may account for temporal information when estimating how many messages have received impressions. For example, an account holder views significantly fewer messages from a message stream requested in the morning than one requested in the evening. In this example, the frontend module infers impressions with more messages from the message stream requested in the evening than the message stream requested in the morning based on the temporal analysis of the account's previous impressions. Hence, the frontend module 110 determines, infers, and/or estimates account holder impressions of messages using one or more techniques of varying precision.

The frontend module 110 allows account holders to manage their account with the messaging platform 100. The account holder can manage privacy, security, and advertising settings as well as directly manage their connections to other users. Generally, the messaging platform 100 does not require the user to contribute a large amount of personal information. The frontend module 110 allows the user to identify an account name (not necessarily a real) name, provides pictures of media, provide a brief description of themselves/their entity, and a website. However, the messaging platform 100 does not necessarily request or store traditional real-world identifying information such as age, gender, interests, history, occupation, etc. Instead, the messaging platform 100 is configured to infer information about the user based on the account holders they follow, the account holders that follow them, the messages they compose, and the messages they engage with. Any information explicitly provided or inferred about the user is stored in the account repository 146.

The messaging platform 100 allows an advertiser, who is generally also an account holder, to pay to advertise within the message streams of other account holders. In addition to providing advertisers with the opportunity to advertise within message streams, the messaging platform also assists the advertiser in identifying when to advertise and to whom. To do this, the messaging platform 100 includes an advertising system that includes advertisement module 120 (also referred to as the ad module 120), an advertiser frontend module 115, an advertisement repository 148, and a purchase repository 156.

Advertisers manage advertising campaigns within the messaging platform using an advertiser client software application running on an advertiser client computing device 102, such as a mobile phone, a personal computer (laptop, desktop, or server), or a specialized appliance having communication capability. The advertiser client device may be the same device as client 105, or a different device. The advertiser client software application generally includes a web-based client, an email-based interface, or an API function-based interface, though it may be constructed using any interface that provides the functionality described herein.

The advertiser frontend module 115 exchanges data with the advertiser client 102, interfaces with other internal components of the messaging platform 100, and provides advertisers with information regarding their advertising campaigns. The advertiser frontend module 115 may provide a variety of interfaces for interacting with a number of different types of advertiser clients 102, in a manner similar to the frontend module 110. Through the advertiser frontend module 115, the advertiser client 102 is able to create and adjust ad campaigns, create and adjust advertisement messages to be included in those campaigns, track expenditures on ad campaigns, and view the results of those ad campaigns.

When creating an ad campaign, the platform 100 allows the advertiser to specify information for how to serve messages in the ad campaign. For targeting, the advertiser can specify to platform 100 a type of target account, a desired feature in a target account, or another advertiser with similar products so that the ad module 120 can identify target accounts associated with that advertiser. The advertiser can also specify to platform 100 how much to spend per message (i.e., a bid, a maximum bid, etc.), for the entire ad campaign (i.e., budget), or for all ad campaigns of the advertiser (i.e., budget). This can be specified for each day (i.e., daily budget), for a specific time period in a day, or for any interval of time. In addition, an advertiser can specify to platform 100 high-level goals for the ad campaign. Examples of high-level goals include asking the ad module 120 to focus on particular types and/or categories of engagements. Information of a created ad campaign can be stored in the advertisement repository 148.

The advertisement module 120 is described with respect to FIGS. 2A and 2B, described immediately below.

III. Advertisement Module

Figure 2A:
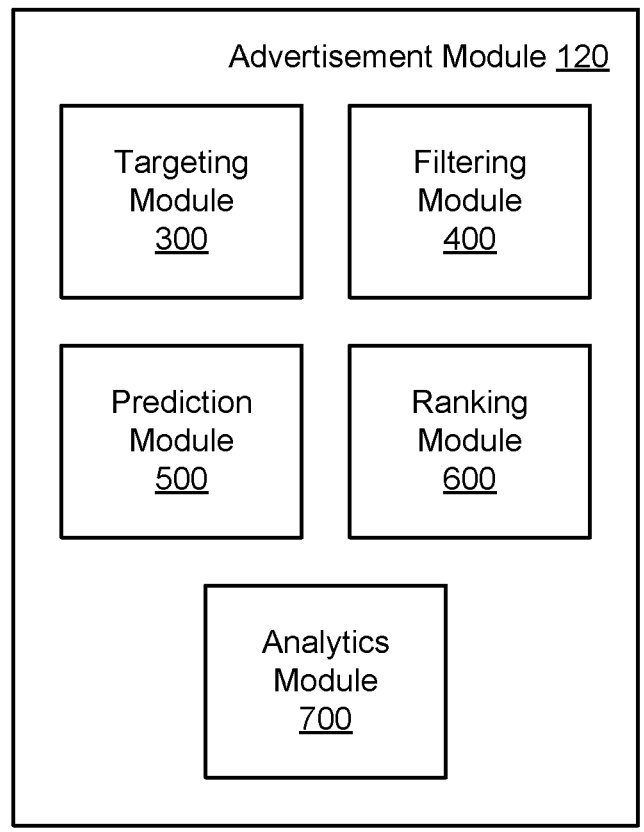
FIG. 2A is a block diagram of an example advertisement module, according to one embodiment.
Figure 2B:
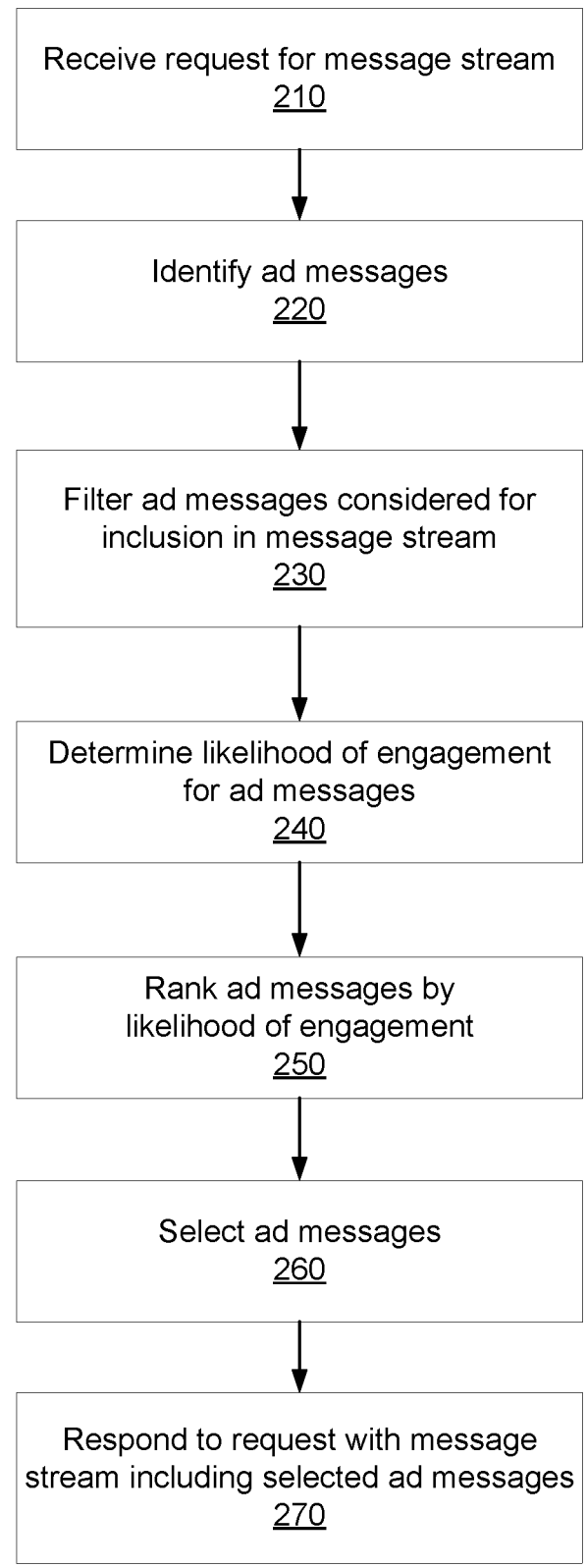
FIG. 2B illustrates an example flowchart for selecting candidate messages for inclusion in a requested message stream, according to one embodiment.

FIG. 2A is a block diagram of an ad module 120, according to one embodiment. In one embodiment the advertisement module 120 includes a targeting module 300, a filtering module 400, a prediction module 500, a ranking module 600, and an analytics module 700. One example function of the ad module 120 is described with respect to the example flow chart of FIG. 2B.

III.A Overview

Generally the advertisement module 120 selects advertisements messages to include in a message stream responsive to a request 210 for the message stream of a particular account holder. The request may be received from the account holder them self, or another account holder wishing to view the requested account holder's message stream. The advertisement module 120 selects advertisements messages that are 1) determined likely to be relevant to the requested account holder and/or the other account holders subscribed to view the requested account holder's message stream, 2) likely to cause engagement by account holders viewing the message stream including the advertisement, and 3) meet the budget constraints of the advertisers purchasing the advertisements.

The actual selection of advertisement messages for inclusion in the message stream occurs in real time responsive to a request from an account holder. To perform the selection, the advertisement module 120 runs a bidding/auction process where different advertisement messages are targeted, filtered, predicted, ranked, and selected based on a bid, the amount they are willing to pay to place the advertisement message in the requested message stream, and other factors such as the likelihood of engagement. Although this bidding process is conducted by the advertisement module 120 in real time, some of the information used to perform the auction requires a great deal of computer processing power to generate. An example of this is the likelihood of engagement for advertisement messages, which is generated based on prior engagement data. As a result, some of the information used in the ranking process is generated in advance of a request for a message stream. This may occur offline and/or asynchronously from the selection process. In some embodiments, this information processing occurs on a periodic basis (e.g., daily), using data collected by the messaging platform 100 during that day and prior days. This information may also be updated incrementally to reflect data collected by the messaging platform 100. In addition, the bidding process can be based on information of previous purchases by advertisers, which is stored in the purchase repository 156.

Upon selection of one or more advertisement messages, the advertisement module 120 inserts the advertisement messages into the requested message stream. The frontend module 110 then provides the requested message stream to the requesting account holder through their client 105. The remainder of this description further describes how the advertisement module 120 selects advertisement messages for inclusion in the requested message stream.

III.B Ad Module Components

The targeting module 300 processes account activity on the messaging platform 100, including candidate messages, message streams, engagements, and other data to identify features associated with accounts and candidate messages. Features are used by the remainder of advertising module 120 to carry out its tasks. In part, the targeting module 300 uses the features to identify 220 candidate messages for inclusion in a requested account. Candidate messages can include social media content authored by an account of the messaging platform (e.g., by the context account) or any other type of content. The targeting module 300 is capable of performing this candidate message-to-account targeting in several different ways, including according to advertiser or ad campaign criteria, via lookalike modeling, and via recent follow modeling.

The filtering module 400 receives a set of candidate messages identified by the targeting module 300 and filters 230 messages from the set according to various filters. The remaining candidate messages that pass the filtering module 400 are evaluated by the prediction module 500 to determine a likelihood of engagement between the candidate messages and an account. For one example filter, the filtering module 400 constructs a fatigue map that tracks which candidate messages an account holder has seen and when the candidate messages were seen. To avoid account holder ad fatigue, the filtering module 400 uses fatigue map data to remove ads from the set of candidate messages based on how recently an account holder has seen an candidate message. In another example filter, the filtering module 400 predicts an candidate message's eventual ranking in the ranking module 600. Candidate messages that rank below a threshold ranking are filtered from the set of candidate messages. In another example filter, the filtering module 400 identifies which candidate messages, ad campaign, or advertisers are tracking to overspend their budget either generally or too quickly, and filters out corresponding candidate messages to help ensure the budget is spent more evenly throughout the day.

The prediction module 500 determines 240 a likelihood of engagement between an candidate message and an account. Using the probability determined by the prediction module 500, the ranking module 600 selects one or more ads to deliver as part of a message stream to a requesting account. To estimate a probability of engagement, the prediction module 500 develops a model of engagement based on data from the repositories (e.g., 140, 142, 144, 146, 148, 152, 154, 156). The data from the repositories are associated with various features, which may be associated with the account, the candidate message, or a correlation between the account and the candidate message. For example, the prediction module 500 considers known or inferred account features (e.g., an inferred age, an inferred location). As a second example, the prediction module 500 considers features of an ad (e.g., associated metadata of the ad, features of the corresponding advertiser account). As a third example, the prediction module 500 considers engagements between messages (including ads) and an account (e.g., reposting or favoriting a message). The prediction module 500 may determine features that depend on a temporal component of data. For example, a feature indicates an account holder's engagements with candidate messages over various time periods (e.g., an hour, a day, a week, a month, a year).

Based on the gathered features, the prediction module 500 develops a model to predict the probability of an account holder's engagement with one or more candidate messages. For example, the prediction module 500 determines weights to assign to various features on a periodic basis based on engagements by the numerous accounts of the messaging platform 100. These weights may then be used to determine a probability of account engagement. The weights may be determined periodically as a batch process (e.g., daily). The prediction module 500 uses these determined weights to predict engagement probabilities substantially in real time between various candidate messages and an account requesting a message stream. The determined probability of account engagement may be used by the ranking module 600 to select one or more ads to present to a holder of a requesting account. The prediction module 600 may also determine multiple models of engagement probability for different types and categories of engagement (e.g., performance engagements, monetizable engagements, etc.). In these cases, the ranking module 600 uses probabilities of engagement with various engagement categories to select one or more candidate messages to present to an account holder.

The ranking module 600 ranks 250 the candidate messages based on the likelihood of engagement as determined by the prediction module 500, as well as based on budget factors for the advertiser. Budget factors can include the bid for the candidate message and the expected cost per engagement for the candidate message, as well as advertiser-level or ad campaign-level concerns such as changing ad budget expenditure over the course of a time period (e.g., over the course of the day), and in order to meet campaign goals (e.g., to achieve particular categories of engagements for purchased ads).

The ad module 120 selects 260 candidate messages from the ranked list of candidate messages for inclusion in the requested message stream, and responds 270 to the request by providing a requesting client 105 the requested message stream.

The analytics module 700 tracks and analyzes message impressions and engagements received through the frontend module 110. The analytics module 700 further provides the results of its tracking and analyses to the advertiser frontend module 115, which in turn provides advertiser clients 102 with data regarding their messages, ad campaigns, and advertiser accounts. Examples functionality of the analytics module 700 includes estimation of ad campaign audience size (e.g., an estimate of the number of accounts that meet targeting criteria specified by an advertiser) and simulation of potential candidate message or ad campaign performance given a bid and associated candidate message content (e.g., using the prediction module 500 and/or the ranking module 600 to predict impressions or engagements for an candidate message).

IV. Targeting

Figure 3A:
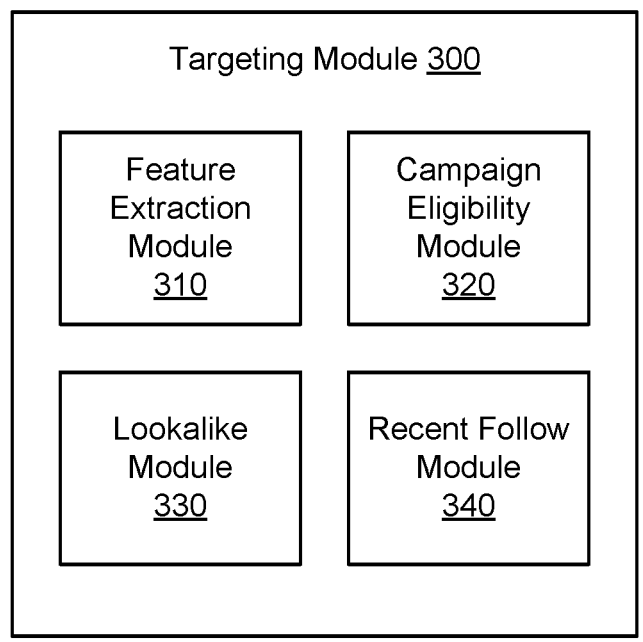
FIG. 3A illustrates a block diagram of an example targeting module in the ad module, according to one embodiment.

FIG. 3A is a block diagram of the targeting module 300 in the ad module 120, according to one embodiment. The targeting module 300 includes a feature extraction module 310, a campaign eligibility module 320, a lookalike module 330, and a recent follow module 340. The feature extraction module 310 determines features of messages and accounts based on messages and engagements created within the messaging platform 100. The targeting module 300 uses the features to target which accounts will receive candidate messages from varying ad campaigns and advertisers. The targeting module 300 is capable of performing this candidate message-to-account targeting in several different ways using the campaign eligibility module 320, a lookalike module 330, and a recent follow module 340. Each of these modules is described in turn below.

IV.A Feature Extraction

The feature extraction module 310 determines features or properties of messaging platform data such as messages (e.g., candidate messages of advertisers, messages (Tweets/Retweets) of account holders) and accounts (e.g., advertiser accounts, user accounts). The feature extraction module 310 is also determines features of ad campaigns and/or of advertisers associated with candidate messages.

Features determined to be associated with data (e.g., messages, accounts, ad campaigns, message-account pairs) generally also have a numerical value for each item of data they are associated with. This value may represent the association itself, or the degree to which the feature is associated with the item of data. Values associated with a feature may be binary, integer, fractional, real, positive, negative, or non-negative, for example. Further, any given item of data may be associated with more than one feature. An example feature of an account is an interest in a genre of music. If the account is determined to be interested in a musical genre, then an example feature corresponding to that musical genre may have a value of one if that example feature is defined to have binary numerical values. As another example, a message feature reflects whether the message is associated with a location (e.g., San Francisco). This example message feature may have a value equal to a computed probability that the message is associated with the location. As another example, an account feature may indicate the account's interest in climbing. The account feature may be computed based on a count of the number engagements between the account and messages that have content relating to the account (e.g., climbing messages). Hence, the value of this example feature may be greater than one.

Figure 3B:
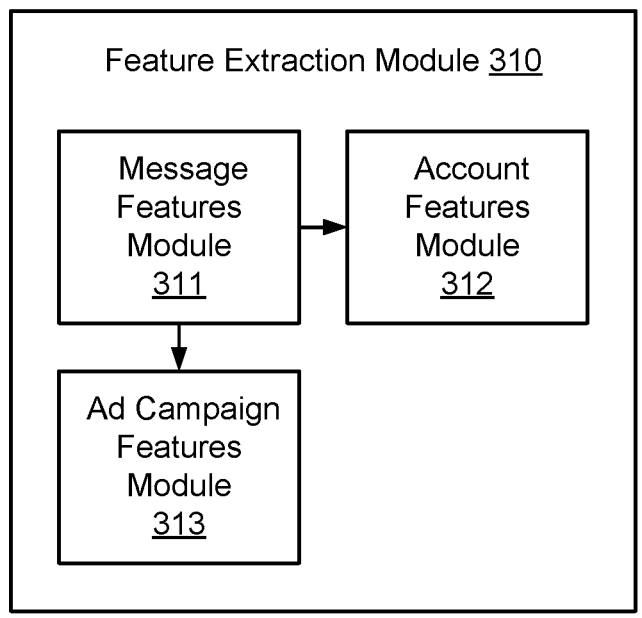
FIG. 3B illustrates a block diagram of an example feature extraction module in the targeting module, according to one embodiment.

Features may also be organized hierarchically. For example, the property a feature represents may be part of a class of properties, which in turn is part of a super-class of properties. These classes, super-classes, (and so on) may have features associated with them. For example, various features record an account's interest in various comedy movies. These specific comedy movies may be part of a general comedy movie class associated with a feature that summarizes an account's interest in comedy movies. In this case, the value of the comedy movie feature depends on the value of the features for specific comedy movies. The comedy movie feature may further be part of a movie super-class, which is associated with a movie feature that measures an account's general interest in movies. The value of the movie feature depends on the values of members in the movie super-class including specific comedy movie features, the comedy movie class's feature, and other features associated with different genre classes. A feature may be a member of more than one class. For example, comedy movies may be part of a comedies super-class feature in addition to a movies super-class feature, which are both in turn part of a media class. As another example, location features associated with a neighborhood may modify the value of features covering successively broader geographic locations (e.g., neighborhood, city, metropolitan area, state, region, country). These various layers generalize an account's features to broader categories. Extraction of the features are described in more detail in conjunction with FIG. 3B of the feature extraction module 310. FIG. 3B illustrates a feature extraction module 310 including a message features module 311, an account features module 312, and an ad campaign features module 313, according to one embodiment.

IV.A.1 Message Features

The message features module 311 associates features with messages and determines values for features associated with messages, including messages authored by an account as well as candidate messages. The message features module 311 stores features associated with a message in an entry of the message repository 140 corresponding to that message. Message features are used to help determine other features, such as account features (by the account feature module 312), ad campaign features (by the ad campaign features module 313), account-ad features (by the cross features module 520), and temporal features (by the temporal features module 525). Additionally, the engagement prediction module 530 uses features determined for messages to develop a model of account engagement, which is used to determine the likelihood of engagement between the requesting account and various candidate messages based on the determined features of the advertising messages.

To associate message features with a message and determine values for those message features, the message features module 311 processes the content of messages, including any aspect of a message such as visible message content and metadata content of the message. To infer a feature from textual content of a message, the message is tokenized into keywords (or topics) through linguistic processing. Relevant topics may be maintained in a database updated based on one or more external data feeds. Some features may be associated with a message with the aid of an external data feed. For example, the message features module 311 recognizes topics in a message describing a concert event and uses a database of concert events to associate additional features with the message. In the example, the message features module 311 associates the message with features representing the location of the concert and performers at the concert after inferring that the message is associated with the concert event based on the presence of the concert message feature and a correlation between the concert, a theater location, and a musical performer.

Examples of topics are numerous and a non-exhaustive list includes a location, a notable person (e.g., a celebrity, a politician, a performer, a fictional character), an organization (e.g., a business, a non-profit, a governmental agency), an event (e.g., a news event, weather, a product release, a political event, a social event, a concert, a festival, a sporting event), a cultural work (e.g., a book, a movie, a television program), an item (e.g., a consumer product, hobby equipment), or an idea (e.g., a movement, an ideology).

In addition to linguistic or semantic processing of a message's textual content, the message features module 311 may infer features of a message from non-textual message content such as an image, an animation, a video, or an audio file. To infer features, the message features module 311 may employ processing appropriate to the type of non-textual message content. For example, module 311 may perform image recognition processing to recognize a likeness of a message feature in message content. For example, a message may be associated with a Tom Brady feature by performing image recognition on an image of Tom Brady. The message features module 311 may combine text-to-speech processing with tokenization and linguistic analysis to recognize message features from spoken words in message audio content. For example, a message is associated with a New Year's Eve feature based on a spoken discussion of a ball drop and New Year's resolutions in a message video clip. The message features module 311 may recognize published works contained in message content through techniques such as audio or video fingerprint recognition, or watermark recognition. For example, the message features module 311 recognizes a clip of a country music song in the background of a pickup truck ad, so the message is associated with a feature corresponding to the country music song.

The message features module 311 may also infer message features from links (e.g., a Hyperlink, a URL, a network address, a key phrase (i.e., #ILoveIdina)) contained in messages. The message features module 311 may obtain content from the network location identified by the link for use in identifying features associated with the message. For example, if a message contains a link to a webpage, module 311 may analyze images and text on that webpage to associate features with the message. Key phrases are any grouping of characters following a predefined format or sequence. Key phrases can be used for internal linking within the messaging platform 100. One example of a keyphrase is referred to as a "hashtag" (a sequence of characters prefixed by the hash symbol). Key phrases may link to other messages, or message streams. In one embodiment, key phrases are also interpreted by the messaging platform as being ad-hoc accounts comprising their own message streams, where the messages in the message stream of a key phrase include all messages including that key phrase. For example, if a message includes the key phrase #ILoveIdina, then the key phrase links to a message stream of other messages that also include the key phrase #ILoveIdina. Any message content indicated by the metadata may be processed to extract features using content-type-dependent techniques.

The message features module 311 may infer features of a message from metadata of the message. Metadata associated with a message includes a location (e.g., of a device sending the message), a timestamp and/or date of authorship, network routing information, a device, and software (e.g., operating software of the client 105, an application on the client 105 used to view or compose messages). Using a location, the message features module 311 may link a message with a location feature using a geographic database. For instance, geographic coordinates associated with an example message are located at an address of a business; therefore, the example message is associated with that business. A message may be associated with an organization based on network routing information. For example, if the message is routed through a university intranet, the message is associated with a feature corresponding to education or feature representing the university whose intranet routed the message. Similarly, the message feature module 311 associates features with a message such as the device type and software (e.g., browser, application, operating system) of a client 105 that an account holder uses to compose a message. For example, if a mobile device is used to author the message, the message may be associated with features indicating the company that manufactured the device, the mobile device's browser program, a message reader application on the mobile device, and the mobile device's operating system.

Consider an example message having the content "The Orpheum is very theater. So singing. Much Wicked. Wow. #ILoveIdina" By performing semantic processing on the message text, module 311 associates this message with features representing topics including the Orpheum, theaters, Wicked, musicals, San Francisco, the San Francisco Civic Center, Idina Menzel, and #ILoveIdina. If these message features are configured to have binary values, then these features would have a value of one for this message. Based on the features representing the Orpheum theater and San Francisco, the message features module 110 may also infer a location latitude feature (having a value of 37.778857) and a longitude feature (having a value of −122.414653) associated with the message. Alternatively or additionally, the message features module 311 may infer the latitude and longitude location features from geographic location data associated with the message (e.g., from metadata from the device available at the time the message was authored). The message features module 311 may associate a message with features corresponding to various times based on a timestamp of the message. For example, if the frontend module 110 receives a message at 8:00 pm on a Friday in July, then the message features module 311 may associate the message with features representing time periods such as evenings, weekends, and summer.

IV.A.2 Account Features

Using message features determined by the message features module 311, the account features module 312 infers features of an account of the messaging platform 100, and determines values for those features. The account features module 312 may additionally infer features of an account based on graph data from repository 142, account actions on the messaging platform 100 from the engagement 152 and impression 154 repositories, and client-provided information associated with the account from account repository 146 (e.g., age, gender, preferred language, and other user-specified features)

The account features module 312 determines some account features and their values based on established logical relationships between those account features and particular message features. These logical relationships may be established as simple if-then rules, or using more complicated logic to infer account features of an account from messages that account has composed, or engaged with. For example, assume a message has been determined to have values of 1 for the message features of French, dog parks, and Sydney. The account features module 312 may contain logic indicating that a French message feature corresponds to a Francophile account feature, that a dog park feature is associated with account features representing an account's interest dogs, parks, walks, recreation, and dog parks, and that a Sydney message feature corresponds to account features indicating an account's domicile in the city of Sydney and in the country of Australia.

These are merely exemplary account features and, as with message features, many others are possible. Examples include account features associated with locations (e.g., residential, occupational, recreational, and previous) demographics (e.g., age, gender, languages spoken, marital status, educational level, socioeconomic status), affiliations (e.g., institution of employment, membership in an organization, previous or current educational affiliation), or interests (e.g., in a topic).

The account features module 312 may also use declarative account holder information (e.g., a name, a profile image, an account summary) provided through the frontend module 110 in connection with an account profile to determine account features. Because the messaging platform 100 generally solicits minimal information from account holders as part of an account profile, the account features module 312 generally infers many if not most features of an account.

The account features module 312 also correlates message features with account features using external data sources indicating location, demographics, etc. associated with features. For example, an address book and mapping service indicate locations of places mentioned in an authored message, and marketing data indicates demographics associated with content. For example, an account with features that indicate interest in vampire movies is inferred to be associated with a teenage account holder consistent with marketing reports about vampire movies.

The account features module 312 also infers the account features of an account based on engagements by the account holder with messages appearing in their own message stream or the message streams of other accounts, as well as based on engagements by other account holders with the account holder's message stream. When an account engages with a message, then the features associated with the account holder causing the engagement may be modified based on the features of the engaged message and/or the features of the account of the message stream where the engaged message appears. For example, suppose a ski resort account reposts a message about fresh powder snow at a ski resort, and an account holder engages (e.g., expands) that message. In this example, the account features module 312 infers that the account holder is interested in the topics corresponding to features of the fresh power message (e.g., skiing, winter sports). Note that this adjusting of features is not necessarily bi-directional. If account holder A engages with a message on account holder B's message stream, in some embodiments this affects only account holder A's account features, while leaving account holder B's account features unchanged. In another embodiment, the account features of both account holder A and account holder B are adjusted as a result of the engagement. As another example, an account of a nightclub engages (e.g., reposts) a message of an account of a patron. If the nightclub account is associated with features representing bars and dancing, then the patron's engaged account may or may not become associated with features representing bars and dancing, depending upon the embodiment. Alternatively, if features for bars and dancing are defined for non-binary values, the value of the account's features representing bars and dancing increases in response to the nightclub account's engagement.

There are many possible account features based on account actions, examples of which include frequency, number, or regularity of logins, message stream requests, message impressions, authored messages, engagements with messages, or logins to the messaging platform. Other possible account features may be inferred based on operating system in client 105 used for access, make or manufacture of client 105, browsing application used, or social media viewing application used.

The account features module 312 also infers account features based on unidirectional connections between accounts as stored by repository 142. For example, the features module 312 infers account features based on inferred features of accounts that an account is subscribed to and based on messages authored by those followed accounts. As a more specific example, if account follows a number of accounts that are inferred to live in a metropolitan area because they have authored messages about businesses predominantly located in that metropolitan area; then module 312 infers that the owner of account A lives in that same metropolitan area. The account features module 312 may traverse multiple layers of the connection graph data in inferring account features. For instance, account A's features may be inferred based on the account features of other follower accounts who are also subscribed to a same source account as account A. For example, account A is inferred to be interested in a musical group because both account A and a number of other accounts are all subscribed to follow account B, and those other follower accounts share a non-zero value for a feature associated with that musical group.

IV.A.3 Ad Campaign Features and Campaign Eligibility

The ad campaign features module 313 associates features with an ad campaign that an advertiser account has configured through the advertiser frontend module 115. The features determined by the ad campaign features module 313 are used by the engagement prediction module 530 to model and predict engagement. The ad campaign features module 313 may use features inferred by the message features module 311 for candidate messages and the account features module 312 for an advertiser. An ad campaign comprises a one or more candidate messages. As part of an ad campaign, the advertiser may specify various campaign features such as target demographics, locations, interests, or affiliations, which are used to inferred features of the advertising campaign. The advertising campaign may inherit features from the advertiser account that configures the campaign. An ad campaign may be associated with multiple advertiser accounts (e.g., accounts affiliated with advertisers conducting a joint campaign, different accounts associated with the same advertiser). The advertising campaign features may be used to infer features of candidate messages that are part of the ad campaign.

Although the message, account, and ad campaign features modules 311, 312, and 313 may calculate or determine features substantially in real time when responding to a request for a message stream, these modules may alternatively or additionally determine these features as part of a periodic process and store the inferred features in the appropriate repository (e.g., 140, 146, 148). In this way, the messaging platform 100 avoids repeating the same feature calculations by the message, account, ad/or ad campaign features modules 311, 312, and 313. For example, the message features module 311 may determine which features are associated with a message when a message is authored, and the account features module 312 may update account features of the account that authored the message based on the message. Alternatively, these determinations may be incorporated into a daily process run overnight during low load times for the messaging platform.

The campaign eligibility module 320 receives a request for the message stream of an account holder, and identifies candidate messages, ad campaigns, and/or advertisers eligible to advertise in the requested account holder's message stream based on the account and candidate message features.

The campaign eligibility module 320 manages received requests to serve one or more candidate messages to an account holder with the candidate messages in the ad repository 148. Based on a first set of extracted features associated with a target account associated with a received request and additional sets of extracted features of candidate messages to be served, the campaign eligibility module 320 determines a final set of candidate messages to be served to the target account. The final set can be determined based on a similarity measurement (e.g., cosine similarity, etc.) between the first set and additional sets of extracted features. Alternatively or additionally, the campaign eligibility module 320 can also determine a final set of target accounts to be served an candidate message based on extracted features of the target accounts and the candidate message. The final set of target accounts can also be based on a similarity score (e.g., cosine similarity, etc.) between the extracted features.

The account features module 312 infers features of advertiser accounts similarly to features of other accounts. For example, features are inferred based on features of messages that an advertiser account has authored or engaged with. Additionally, advertiser accounts may provide additional data through the advertiser frontend module 115 such as business locations, items sold, target demographics, target interest groups, target affiliations, similar businesses, or ideal customer profiles. This additional declarative information is used to associate an account with features, and may override inferred features or receive a higher weighting when used to infer other features.

IV.B Lookalike Modeling

The lookalike module identifies accounts that are similar to a requested account. This conveniently allows an advertiser to specify an account that typifies the audience of accounts they wish to target advertising towards, and allows the messaging platform 100 to automatically identify additional accounts that match the target account. Typically, this request comes in one of three forms: identify a list of accounts that share similar features to a target account, identify a list of accounts that share similar followers to a target account, and identify a list of accounts who follow similar accounts to a target account.

To identify similar accounts, the lookalike module 330 quantifies the similarity between the target account and each of a number of other accounts. In one embodiment, this is accomplished by determining one or more similarity features that quantify the similarity of the unidirectional connection graph connections between the two accounts (the target account and an additional account) stored by repository 142. These features include the overlap in the list of followers of each of two accounts, overlap in the list of accounts each of two accounts follows, and counts of co-mentions in messages authored by each account (e.g., a message from the target account mentions the additional account via key phrase link). Each of these features assumes that the target account and the additional account are similar real-world advertising targets if the underlying similarity features have sufficiently high values.

Overlaps in followers and accounts followed may be determined by raw count, or using cosine similarity comparison. To determine the cosine similarity in followers or accounts followed, each follower (or account followed) from each of the two accounts is assigned an entry in a vector. The values of the entries in the vector are binary where a 1 represents that the account is followed by (or follows) the corresponding account. The dot product of those vectors indicates the degree of similarity between the follow lists (or accounts followed), and may be stored as the value of a corresponding similarity feature. The similarity feature between a target account A and additional account B can also be determined based on:

$$J(A_f | B_f) = \frac{|A_f \cap B_f|}{|A_f \cup B_f|} \quad (1)$$

where $J(A_f|B_f)$ is a Jaccard similarity coefficient between followers of A ($A_f$) and followers of B ($B_f$). The Jaccard similarity coefficient is a ratio of shared followers normalized by a total number of followers of target account A and additional target account B. Alternatively, similarity can be determined based on any other similarity comparison that determines a value representing a ratio of shared followers to total followers associated with accounts A and B.

Overlap in features associated with the two accounts may also be determined by raw count, using cosine similarity comparison, using Jaccard similarity, or using any other type of similarity comparison. For example, a similarly feature of an account can be a similarity score between two accounts based on a cosine similarity of the account features of the two accounts. To determine the cosine similarity in features, each feature from each account is assigned an entry in a vector. The values of the features are entered in the entries of the vectors. The dot product of those vectors indicates the degree of similarity between the feature sets, and may be stored as the value of a corresponding similarity feature.

The lookalike module 330 may also identify similar accounts based on production patterns of target accounts. A production action of an account includes original messages authored by an account, or any other suitable action that was taken first by a user of the account in the platform 100. The lookalike module 330 can determine the similarity between two accounts by comparing the message features of original messages authored by the two accounts. As above, this similarity may be determined from a similarity score between the message features of the original messages of each of the accounts. This similarity score may be determined by raw count of overlapping message features, cosine similarity, Jaccard similarity, or any other similarity comparison. The lookalike module 330 can also determine the similarity between two accounts by training machine learning algorithms on the original messages authored by the account holders.

The lookalike module 330 may also identify similar accounts based on consumption patterns of target accounts. A consumption action of an account includes reposts, follows, engagements with, impressions of, or any other suitable action taken by a user within the platform 100 with respect to existing messages. The lookalike module 330 can determine similarity between two accounts by determining a similarity score between the message features of the acted-upon messages of each of the accounts. The similarity score may be determined by raw count of overlapping message features, cosine similarity, Jaccard similarity, or any other similarity comparison. The lookalike module 330 can also determine the similarity between two accounts by training machine learning algorithms on the acted-upon messages.

IV.C Recent Follows

The recent follow module 340 identifies accounts that have recently created unidirectional connections with other accounts (e.g., they have "followed" those accounts). This conveniently allows an advertiser to target advertising towards accounts that have recently followed a target account (or set of target accounts). If a first account follows a second account within a given time frame (e.g., within the last 24 hours), the first account is considered a recent follow of the second account. In addition, the recent follow module 340 can select accounts for advertising by identifying similar accounts to recent follows of a target account. For example, the target account is an advertiser account, and module 340 identifies accounts that are similar to recent follows of the advertiser account. Similarity between accounts can be determined by the lookalike module 330 as described above.

The recent follow module 340 also includes logic for conditional advertising that is triggered responsive to tracked account activity. Responsive to a target account following a threshold number of other accounts, or responsive to a threshold number of accounts following the target account, or any combination thereof, the target account or any of the following/followed accounts can be selected as an account to receive an candidate message. This selection may also include consideration of other information known about the accounts such as an associated email domain suffix associated with a selected account, a number of followers associated with a selected account in a geographical location, IP information associated with a selected account, or temporal information associated with followers and followed accounts of a target account. Geographical locations can be based on cities, countries, regions, or any other suitable locational information. IP information can be a login IP address of the account and can be based on portions of the IP address including a network prefix, a host number, a subnet number, or any combination thereof. Engagements can also be used to identify selected accounts. If the publishing account that the target account follows has at least a threshold number of requests from other accounts to view its message stream, the publishing account can be selected as an additional account. If an additional account and target account have a threshold number of mutual followers or mutual followed accounts, the additional account can be selected as well.

V. Filtering

Figure 4A:
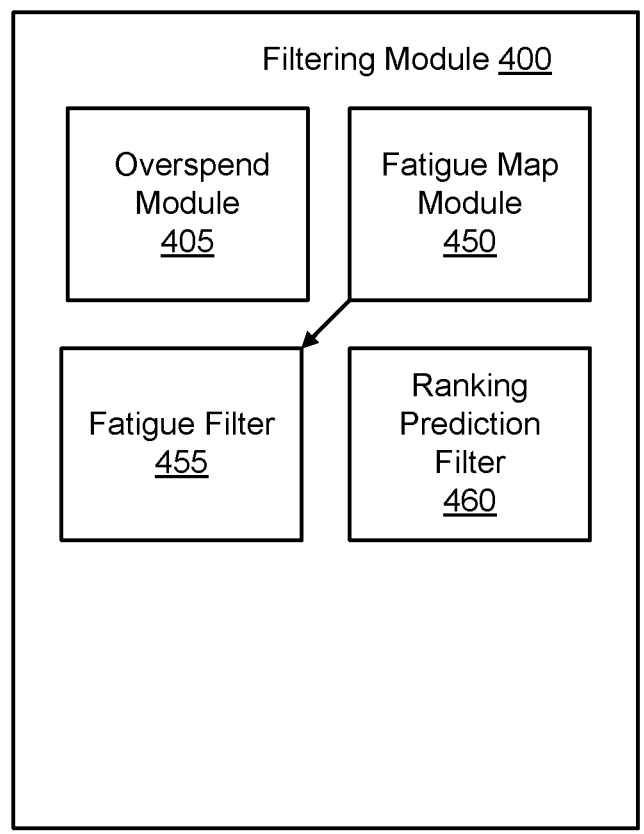
FIG. 4A illustrates a block diagram of an example filtering module, according to one embodiment.

FIG. 4A illustrates a block diagram of the filtering module 400 in the ad module 120, according to one embodiment. The filtering module 400 includes an overspend module 405, a fatigue map module 450, and a fatigue filter 455, and an expected engagement filter 460.

V.A. Overspend Filter

Regarding payment methods for including ads in message streams, the ad platform 120 allows advertisers to purchase message stream space for a candidate message by paying per engagement with the candidate message. For example, the advertisers can pay a bid amount each time the candidate message receives an engagement from an account holder associated with the message stream. An candidate message included in a message stream does not always receive an engagement immediately after inclusion in the message stream. For example, there is a time lag between when an candidate message is served and when an engagement with the candidate message is received. Since the advertiser does not pay until an engagement is received and an advertiser does not know how many engagements an candidate message will receive, there is an uncertainty of how much serving an candidate message will cost for the advertiser. Therefore, the entire budget associated with an ad campaign of an advertiser could, potentially, have been spent when there are still one or more candidate messages of the ad campaign included in message streams that have not yet received engagements. In this situation, when those candidate messages do receive engagement callbacks, there would be no money left in the budget to pay for engagements received. For example, engagements can be received within a day, within a week, within a month, or after a much longer time period.

In order to assist advertisers with overspending their budgets, the overspend module 405 determines a total outstanding spend for each ad campaign as a function of time associated with a candidate message being considered for a received request. The overspend module 405 can update the total outstanding spend for each ad campaign every time a new request to serve an candidate message is received or a candidate message is served. Additionally, the outstanding spend can be updated periodically (e.g., every few minutes or every few hours). An outstanding spend of an ad campaign is a predicted amount of money that will be spent on candidate messages that have been included in message streams of account holders but have not yet received engagements. The overspend module 405 also tracks the current spend as a function of time and remaining budget associated with each ad campaign or candidate message. The current spend is a total of how much an advertiser has paid the ad module 120 for served candidate messages that have received engagements. The remaining budget is a difference of a budget specified by an advertiser for the ad campaign or candidate message with the current spend. Based on the current spend, the remaining budget, and the total outstanding spend, the overspend module 405 filters which candidate messages are allowed to win bids for message stream space in order to help prevent overspending.

To determine the outstanding spend of an ad campaign, the overspend module 405 determines various parameters derived from historical data of engagements with previously served candidate messages on the messaging platform 100. The historical data of engagements with previously served candidate messages for specific ad campaigns can be accessed from the engagement repository 152. Examples of parameters used to determine total outstanding spend include an impression callback rate (ICR), an engagement rate, an engagement time distribution, or any combination thereof.

An impression callback rate is a percentage of served candidate messages included in message streams that have received an impression (been "seen") by account holders that requested those message streams. The ICR may be determined based on impression data in the impression repository 154. Inferring account holder impressions of messages is described previously with respect to FIG. 1. An engagement rate is a percentage of "seen" served candidate messages that receive monetizable engagements. The overspend module 405 determines the engagement rate based on a likelihood of engagement (also known as pCTR, or predicted click-through rate), which is further described below in conjunction with the prediction module 500 of FIG. 5A.

Figure 4B:
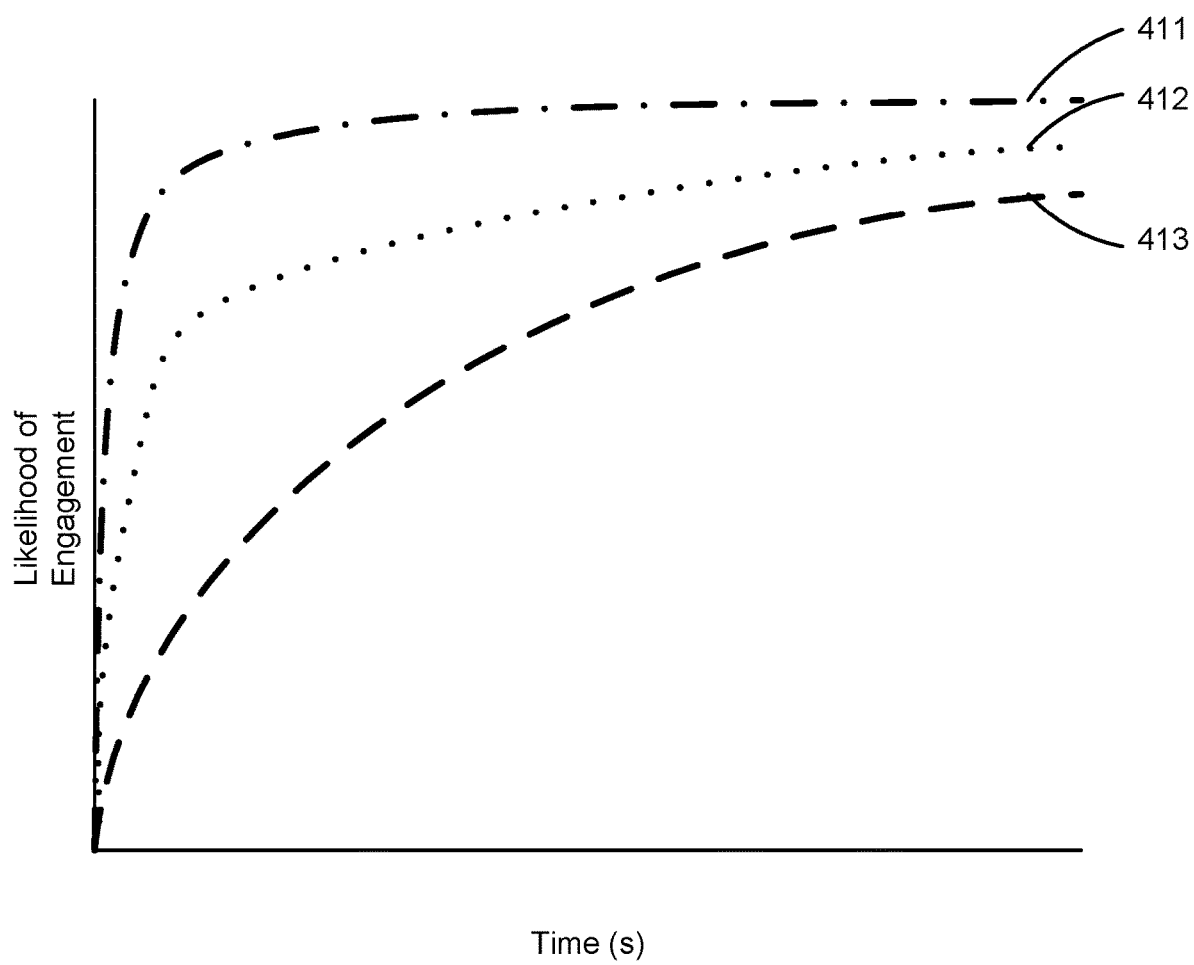
FIG. 4B illustrates example distributions for time elapsed between serving an candidate message and receiving an engagement with that candidate message from a client based on empirical engagement data, according to one embodiment.

An engagement time distribution is a distribution describing how long, after serving an candidate message, an engagement will be received from an account holder served the candidate message. The engagement time distribution is determined based on historical data of how many engagements are received for served candidate messages over time for advertisers in the messaging platform 100. FIG. 4B illustrates three example distributions 411, 412, 413 for time elapsed between serving an candidate message and receiving an engagement with that candidate message from a client 105 based on empirical engagement data, according to one embodiment. Such distributions can be specific to the ad campaign associated with the candidate message, a distribution specific to the advertiser of the candidate message, or a distribution associated with a set of ad campaigns. For a new an candidate message, ad campaign, or advertiser who is just starting to work with the messaging platform 100, such distributions can be extremely helpful in determining which ads messages or campaigns to purchase. Further, depending upon the data selected for the distribution, the distribution's curve may have varying shape as illustrated by example distributions 411, 412, and 413.

Engagement time distribution can also be based on more than one spend smoothing distribution that, combined, provide a more accurate model of how to spend the budget associated with the candidate message. Each spend smoothing distribution can be based on engagement data that is specific to particular types of clients 105. For example, clients 105 can be mobile phones such as ANDROID, IPHONE, or WINDOWS phones or other computing devices such as a tablet, a desktop, etc. Client-specific engagement data is of candidate messages previously presented to one or more specific account holders, a type of client device or any other suitable specific client 105. A spend smoothing distribution can also be an exponential distribution calculated based on a mean time or a combination of a plurality of other calculated distributions. For example, the engagement time distribution can be created according to:

$$ETD = \alpha^* + D_1 \beta^* D_2 + \qquad (2)$$

where ETD is the engagement time distribution, $D_1$ and $D_2$ are spend smoothing distributions, and $\alpha$ and $\beta$ are tunable parameters.

Based on the various parameters, the overspend module 405 determines outstanding spend. As stated previously, an updated outstanding spend can be calculated at some fixed interval and/or each time a request is received that the advertiser bids on. The updated outstanding spend (upOS) is based on a previous outstanding spend (prevOS), the change in time (deltaTime) from when the previous outstanding spend was calculated to when the recent request was received, the various parameters, a cost per engagement (CPE), or any combination thereof. For example, the cost per engagement can vary for engagement category. In one embodiment, the updated outstanding spend is calculated according to:

$$upOS = prevOS * e^{(-deltaTime * expMean)} + ICR * pCTR * CPE. \qquad (3)$$

The overspend module 405 removes from consideration candidate messages associated with advertisers that have total updated outstanding spends (total_upOS) that exceed or equal their remaining budget (rBudget) according to:

$$total\_upOS \geq rBudget \qquad (4)$$

Strictly filtering the candidate messages based on this equation can result in candidate messages from the ad campaign being served more slowly. To address this potential problem, one of the one or more spend smoothing distributions, based on which the engagement time distribution is determined, can be modified to predict a more accurate time between when the candidate message is served and when the candidate message receives an engagement.

Figure 4C:
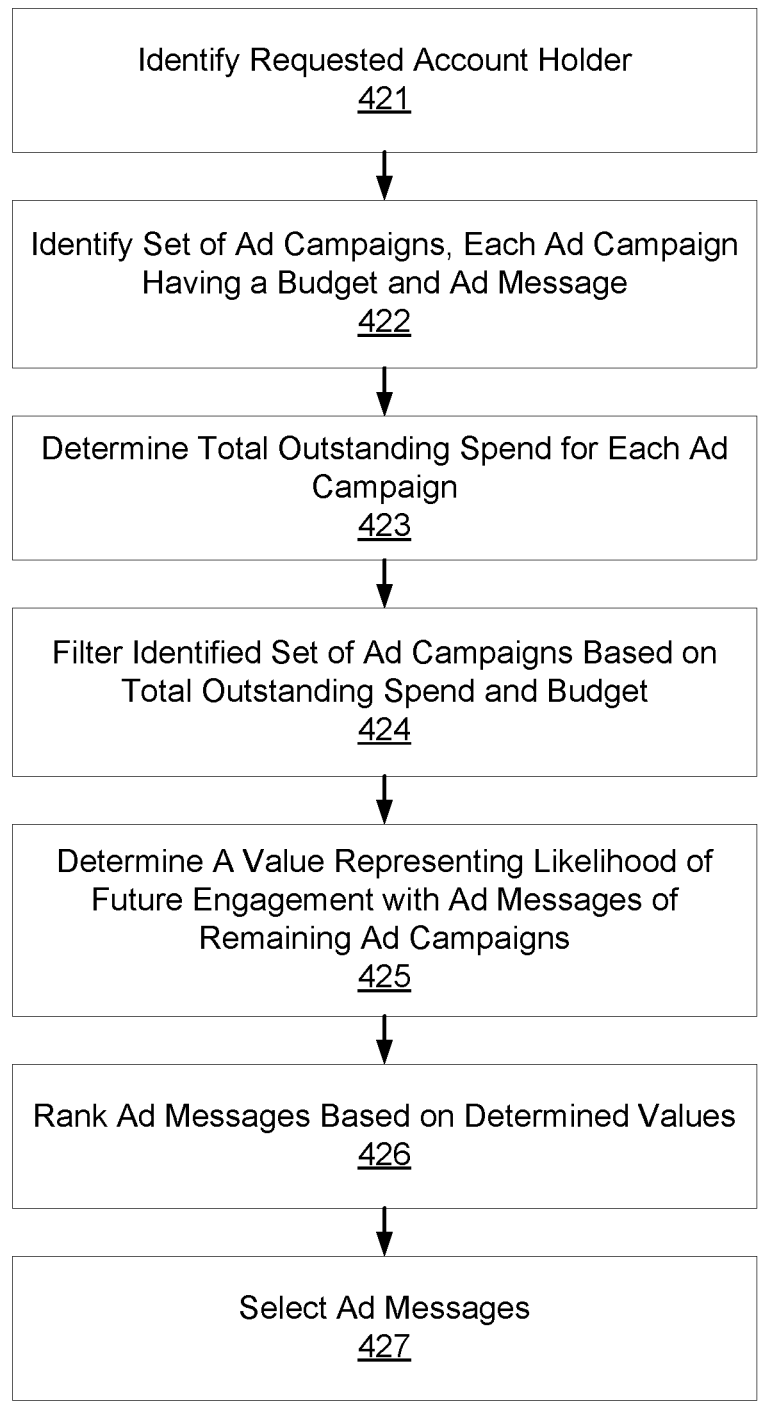
FIG. 4C illustrates an example flow chart of a process for filtering ad campaigns based on outstanding spend associated with advertisers of the ad campaigns, according to one embodiment.

FIG. 4C illustrates an example flow chart of a process 420 for filtering ad campaigns based on outstanding spend associated with advertisers of the ad campaigns, according to one embodiment. The frontend module 110 identifies 421 a requested account holder of the messaging platform 100, which will generate a message stream of messages to be published based on the requested account holder. The ad module 120 identifies 422 a set of candidate ad campaigns comprising candidate messages in the messaging platform 100. Each ad campaign in the messaging platform 100 includes a budget and at least one candidate message.

Figure 4D:
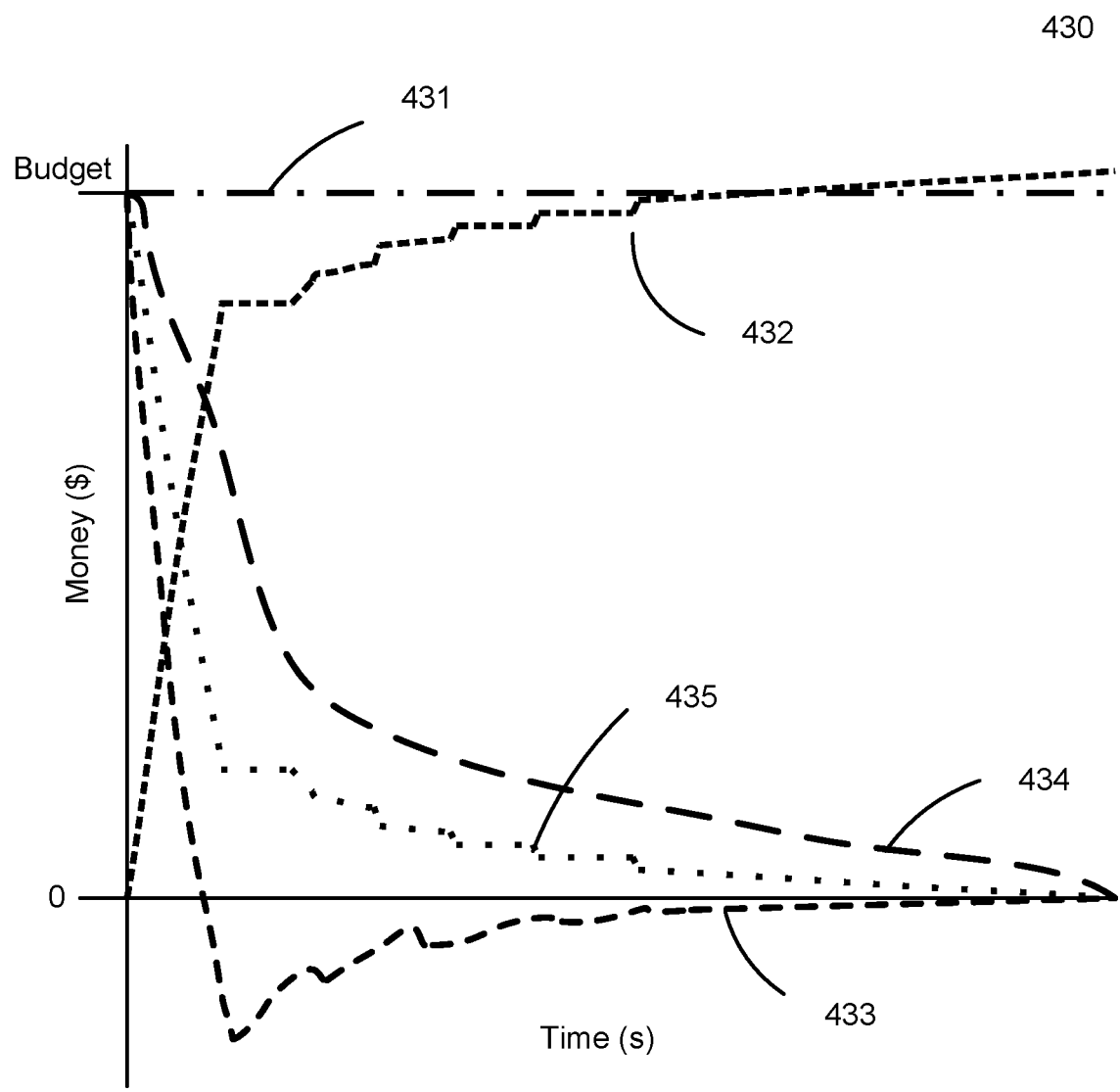
FIG. 4D illustrates an example determination of outstanding spend for an example campaign, according to one embodiment.

For each of the ad campaigns, the overspend module 405 determines 423 a total outstanding spend for the ad campaign for publishing candidate messages in the messages streams of a plurality of account holders of the messaging platform 100. The total outstanding spend includes a portion of the budget already spent and a portion of the budget expected to be spent based on previously published advertisement messages. FIG. 4D illustrates an example determination of outstanding spend for an example campaign, according to one embodiment. As illustrated in FIG. 4D, the ad campaign is associated with a budget 431. The ad campaign is also associated with the outstanding spend 435 which is tracked over time and a remaining budget 434.

The overspend module 405 filters 424 the identified set of ad campaigns to remove ad campaigns whose budget exceeds the total outstanding spend to identify a subset of remaining ad campaigns. For example, as shown in FIG. 4D, the overspend module 405 checks that the budget 431 is greater than the total outstanding spend 432 of the ad campaign. If an ad campaign has a total outstanding spend 432 that exceeds the budget 431, then the overspend module 405 filters 424 the candidate messages of the ad campaign from a set of candidate messages considered for delivery in the requested message stream.

The engagement prediction module 530 determines 425 a value for each candidate message of the remaining ad campaigns. The value represents a likelihood of future engagement with the candidate message by a recipient account holder of the message stream were the candidate message to appear as one of the published messages in the message stream. Based on the determined values, the ranking module 600 ranks 426 the candidate messages of the remaining ad campaigns and the ad module 120 selects 427 at least one of the candidate messages for inclusion in the message stream of the requested account holder based on the ranking.

V.B. Fatigue Maps and Fatigue Scores

The fatigue map module 450 constructs a fatigue map between accounts and messages based on candidate messages an account holder has seen, as recorded in the impressions repository 154. Using the fatigue map, the fatigue filter 455 removes candidate messages to prevent an account holder from seeing the same candidate message excessively. The fatigue map indicates the candidate messages that have received an impression from an account holder as part of a message stream and/or the accounts that have received each candidate message. The entries of the fatigue map contain pointers to accounts in the account repository 146 as well as pointers to candidate messages from the ad repository 148. Additionally, the fatigue map entry between an candidate message and an account may contain pointers to impressions between the candidate message and the account (e.g., in the impression repository 152) as well as pointers to engagements between the candidate message and account (e.g., in the engagement repository 154). The fatigue map entry for an account may indicate timestamps associated with impressions and/or engagements.

Based on the number of impressions and time of those impressions, the fatigue map module 450 may compute a fatigue score between an account and an candidate message. Generally, the more recently the account holder has seen the candidate messages, and the more impressions between the candidate message and the account, the higher the fatigue score. For example, the fatigue module 450 calculates the fatigue score of an candidate message with n impressions according to:

$$F(t) = \sum_{k=1}^{n} A_k e^{-a*(t-t_k)} \quad (5)$$

where F(t) is the fatigue score at time t, e is an exponential function, k is the index of impressions from 1 to n, $t_k$ is the time of the k-th impression, a is decay constant, and $A_k$ is a fatigue factor associated with the candidate message corresponding to the k-th impression. The decay constant a controls how long an advertisement perceptibly contributes to the fatigue score. For example, the decay constant a may be set so that an impression's contribution to the fatigue score is negligible after a week. In other words, the fatigue score is based on a weighted combination of exponential decay factors each corresponding to an impression between the requested account and an candidate message (e.g., a candidate message). The exponential decay factor decays based on time elapsed since the impression the exponential decay factor represents.

The fatigue factor $A_k$ may account for how prominent an candidate message is or for engagements with the candidate message. For example, an account holder may perceive an candidate message with an image as more aggressive than an all-text candidate message, so the fatigue factor $A_k$ for an candidate message with an image is higher than the fatigue factor $A_k$ for an all-text ad. Similarly, an candidate message that contains an automatically playing video has a higher fatigue factor $A_k$ than an candidate message with a video that does not play automatically. The fatigue map module may modify the fatigue factor $A_k$ for the k-th impression of an ad based on an engagement that occurred during that k-th impression. For example, the fatigue map module 450 increases the fatigue factor $A_k$ for an candidate message because an account holder has dismissed that candidate message. Negative engagements with an candidate message (e.g., dismissing the candidate message) increase the fatigue factor $A_k$ for an impression; conversely, a positive engagement (e.g., a repost) with an candidate message decreases the fatigue factor $A_k$ for an impression. A positive engagement (e.g., a follow) may even be associated with a negative fatigue factor $A_k$ for an impression. Hence, the fatigue factor $A_k$ accounts for engagements and candidate message obtrusiveness when computing an example fatigue score. This fatigue factor $A_k$ acts as a weighting factor in a weighted combination of exponential decay factors corresponding to impressions.

The fatigue map module 450 may track candidate messages received from the same advertiser account or as part of the same advertising campaign. For example, an account receives an candidate message promoting milk from an advertiser account that promotes dairy products. If the dairy products advertiser account has another candidate message about cheese, then the example fatigue map entry corresponding to the account and the cheese candidate message indicates that an candidate message from the same advertiser account has already been seen. Using the fatigue map entry corresponding to an account, the fatigue map module 450 may determine a fatigue score between an account and an ad campaign. For example, the fatigue score between an account and an ad campaign is the sum of the fatigue scores of the ad campaign's component messages with respect to the account. Similarly, the fatigue map module 450 may determine a fatigue score between an account and advertiser account. For example, the advertiser fatigue score is the sum of the fatigue scores of the advertiser's ad campaigns with respect to the account.

To update the fatigue map, the fatigue map module 450 may modify fatigue map entries in the account repository 146 and/or the ad repository 148 as part of a periodic or batch process. The fatigue map module 450 may also incrementally adjust the fatigue map in response to routing candidate messages to an account when an account holder requests a message stream through the client 105. In response to the request, the fatigue map module 450 updates the fatigue map entry for the requested account to include any candidate messages placed in the account's message stream. The fatigue map module 450 also updates the fatigue map entries for any candidate messages included in the message stream to indicate that the requested account received the candidate message. Overall, the fatigue map module 450 catalogues impressions between an account and candidate messages and summarizes these impressions in a fatigue score.

V.C. Fatigue Filter

Based on the fatigue map constructed by the fatigue map module 450, the fatigue filter 455 removes candidate messages from the set of candidate messages targeted towards an account. The fatigue filter 455 may apply filters based on multiple levels including the candidate message, the ad campaign corresponding to the candidate message, the advertiser authoring the candidate message, and the targeted account. In one embodiment, the fatigue filter 455 applies filters to candidate messages based on various fatigue scores. As an example, an ad-level filter compares a fatigue score between an candidate message and a requesting account to an ad fatigue threshold. If the candidate message's fatigue score is greater than the threshold, the candidate message is filtered for the requesting user. Similarly, the fatigue filter 455 compares a fatigue score between an ad campaign (or an advertiser account) and an account to a campaign fatigue threshold (or an advertiser fatigue threshold) and filters candidate messages from ad campaigns (or advertiser accounts) having a fatigue score greater than the campaign fatigue threshold (or the advertiser fatigue threshold). As a final example, the fatigue filter 455 removes candidate messages for an account based on a total account fatigue score. In other words, an account stops receiving candidate messages if the account's total fatigue score is greater than an account threshold. Hence, the fatigue filter 455 considers fatigue scores on multiple levels.

Alternatively or additionally to filtering based on fatigue scores, the fatigue filter 455 applies simple filters based on rolling time periods (e.g., last day, week, month, year). For example, if an account has more than a threshold number of impressions of an candidate message, then the fatigue filter 455 removes that candidate message from the set of candidate messages. The fatigue filter 455 may apply multiple such ad-level filters with progressively higher thresholds corresponding to longer rolling time periods. As another example, if an account has received more than a threshold number of impressions of candidate messages from a campaign (or advertiser account), then the fatigue filter 455 removes candidate messages from that ad campaign (or advertiser account). As a final example, the fatigue filter 455 applies account-level fatigue filters based on the fatigue map of a requesting account. In an account-level fatigue filter, the total number of candidate messages shown to the requesting account is considered. As an example account-level filter, if the number of candidate messages shown to an account over a rolling time period is greater than a threshold, then all candidate messages are filtered (e.g., the requesting account receives no candidate messages). Hence, the fatigue filter 455 uses impression data from the fatigue map to provide filtering capabilities at the candidate message, ad campaign, advertiser account, and requesting account levels.

V.D. Ranking Prediction Filter

As will be described further below, the ranking module 600 ranks candidate messages for inclusion in a requested message stream based on an estimated likelihood of engagement with the candidate message should the candidate message appear in the requested message stream. Determining the estimated likelihood of engagement (through the prediction module 500, also further described below) is a computationally intensive process. To reduce the burden of this processing, the filtering module 400 predicts the rank of candidate messages in order to filter out some of those messages.

To do this, the ranking prediction filter 460 creates a model of how candidate message are expected to be ranked based on the features generated by the targeting 300 and prediction 400 modules as described above and further below, respectively, as well as based on previous candidate message rankings determined by the ranking module 600. The ranking prediction filter 460 uses this model to remove candidate messages from consideration for inclusion in the requested account holder's message stream based each candidate messages' prospects for receiving a ranking above a threshold from the ranking module 600.

Filtering out some of the candidate messages in this manner reduces the amount of processing performed by the prediction module 500. Further, ranking prediction is less computationally intensive than engagement prediction because the ranking prediction filter 460 typically considers fewer features (e.g., a selected subset of features) than the prediction module 500. For example, the ranking prediction filter 460 may use account features of the requesting account (e.g., interests, demographics, location, etc.) as well as candidate message features of the candidate message, but no cross or temporal features. As a more specific example, the ranking prediction filter 460 may consider only account features and candidate message features that were considered by the targeting module 300 (e.g., targeting criteria), which may be retrieved more quickly than other features because they may be stored in a cache or local memory due to recent retrieval by the targeting module 300. Thus, although ranking prediction is an additional step in the candidate ad selection process, including ranking prediction results in a net decrease in the amount of processing performed to carry out the selection.

To create the model, the ranking prediction filter 460 considers the candidate messages' features, the requested account's features, as well as the previous rankings of candidate messages in message streams of accounts sharing at least one feature in common with either the candidate messages or the requested account. The ranking prediction filter 460 predicts the likelihood that each candidate message will be ranked by the ranking module 600 above a threshold ranking. In one example, the ranking filter prediction filter 460 uses a logistic regression, in which the probability that a candidate message will rank above a threshold ranking is determined according to:

$$p(R\,|\,\vec{x}_r) = \frac{1}{1 + e^{-\vec{w}\cdot\vec{x}_r}} \qquad (6)$$

where R is a ranking above a threshold ranking, $\vec{x}_r$ is a set of features under consideration, $p(R\,|\,\vec{x}_r)$ is the probability of a candidate message ranking above the threshold ranking given the set of features $\vec{x}_r$, and $\vec{w}_r$ is the set of weights corresponding to the set of features $\vec{x}_r$. The features $\vec{x}_r$ may include account weights and message weights. The ranking weights $\vec{w}_r$ may include account ranking weights for account features and message ranking weights for message features. The probability is determined from a logistic function applied to the dot product (e.g., inner-product) between the set of features (e.g., a features vector) and the set of weights (e.g., a weights vector).

To determine the set of weights $\vec{w}_r$ corresponding to the features $\vec{x}_r$, a logistic regression may be performed according to:

$$\ln\left(\frac{\overline{y}_r}{1 - \overline{y}_r}\right) = \overline{w}_r X_r \qquad (7)$$

where $\vec{y}_r$ is a set of prior ranking probabilities given various feature sets, $X_r$ is a set of feature sets, and $\vec{w}_r$ is a set of weights corresponding to the features. Each of the ranking probabilities is determined based on previous ranking data for candidate messages and accounts sharing at least one of those features. The ranking filter 460 determines a prior ranking probability $\vec{y}_r$ for a candidate message from a number of instances that the candidate message ranked above the ranking threshold relative to a total number of ranking instances of the candidate message. For example, $\vec{y}_r$ is a column vector having entries each corresponding to prior ranking probabilities for different sets of feature values $\vec{x}_r$, $\vec{w}_r$ is a row vector having entries each corresponding to a feature, and $X_r$ is a matrix having a row of features corresponding to each entry of $\vec{y}_r$. In the example, each column of $X_r$ corresponds to a feature and that feature's weight. The regression seeks to find a set of weights that predict the probability of ranking above the threshold ranking given a known set of features. The ranking prediction filter 460 may perform the regression using multivariate techniques to substantially minimize a measure of error between the model of rankings and the retrieved engagement data (e.g., least squares fitting, relative-cross entropy minimization).

Consider example ranking and feature data illustrated in Table 1:

TABLE 1

| | Features | | | |
|---|---|---|---|---|---|
| Feature Sets $\vec{x}_r$ | Boat Ad | Sailing Enthusiast | Top-100 Rankings | Total Rankings | Prior Ranking Probability $\vec{y}_r$ |
| Account A, Candidate message W | 1 | 0.8 | 64 | 80 | 0.8 |
| Account B, Candidate message X | 1 | 0.2 | 12 | 30 | 0.4 |
| Account C, Candidate message Y | 0 | 0.9 | 5 | 25 | 0.2 |
| Account D, Candidate message Z | 0 | 0.1 | 1 | 10 | 0.1 |

The example table indicates four example sets of feature data demonstrating the feature values as well as their corresponding probability of ranking above the threshold ranking. Each of the example feature sets comprises ranking data from how a candidate message ranked for a requested account. The example features include a message feature with a value indicating if the candidate message discusses sailing and an account feature with a value indicating the probability that an account is interested in sailing. The ranking probability computed for each feature set indicates the likelihood of the candidate message ranking above a threshold ranking (e.g. top hundred) based on previous rankings of the candidate message. The ranking prediction filter 460 determines two example weights, one corresponding to each feature. Since the number of example feature sets (four) is greater than the number of example weights, a regression is used to minimize the discrepancy between the determined weights and the feature and ranking data. Alternatively or additionally, the ranking prediction filter 460 may incorporate limited cross features and/or temporal features, which are described further with respect to FIG. 5A.

It should be noted that the number of possible feature sets is very large, so the computational cost of determining model weights may still be relatively high. To reduce computational costs, the ranking prediction filter 460 may group similar ranking data from sufficiently similar feature sets (e.g., a measure of similarity between the feature sets is greater than a threshold). In one embodiment, the ranking prediction filter 460 determines the model weights as a batch or offline process using the data from the repositories 140, 142, 146, 148 and stores the determined model weights for use by the ranking prediction filter 460. The ranking prediction filter 460 may incrementally adjust model weights in response to additional ranking data. Such incremental adjustments may be done substantially in real time after additional ranking data is received, or periodically (e.g., nightly). For example, suppose an candidate message with a message feature representing pizza ranks above the threshold ranking in a ranking of messages for an account with an account feature indicating residence in Chicago. In this example, the ranking prediction filter 460 increases the values of weights corresponding to the Chicago account feature and to the pizza message feature. These updated weights may be used in a model to predict ranking of other candidate messages for other accounts.

If an candidate message is predicted to rank below the threshold ranking, then the ranking prediction filter 460 removes that candidate message from the set of candidate messages. Since the ranking probability $p(R|\vec{x}_r)$ in the example has a range between zero and one, the ranking filter imposes a cutoff ranking probability (e.g., 0.5). The ranking prediction filter 460 removes candidate messages from consideration if those candidate messages have a predicted ranking probability less than the cutoff probability.

As an example, suppose that a candidate message and the requested account are associated with an account feature indicating an inferred age of 25-35 for the account and a message feature indicating the message is associated with surfing. In this example, these features together are associated with high probability of ranking above the threshold ranking according to the ranking prediction model, so the ranking prediction model 460 determines high weight values $\vec{w}_r$ corresponding to these features. Continuing the example, the account has positive values for these features $\vec{x}_r$, so the computed value of $p(R|\vec{x}_r)$ is greater than the cutoff probability. Consequently, the ranking prediction filter 460 does not filter the candidate message.

In an alternative embodiment, the ranking prediction filter 460 may be based on a different metric than a threshold ranking. For example, instead of determining the probability of a candidate message ranking above a threshold ranking, the ranking prediction filter 460 computes the numerical ranking and applies a cutoff ranking to remove candidate messages below the cutoff. In this example, the model is trained directly from retrospective rankings.

In another alternative embodiment, the ranking prediction filter 460 instead predicts the engagement probability output by the prediction module 500. In other words, rather than using data about candidate message ranking among other candidate messages, the ranking prediction filter 460 instead considers the engagement probability used to determine the ranking. Such an alternative embodiment may provide more consistent performance because a candidate message's engagement probability is independent of other candidate messages present, unlike the candidate message's ranking. For example, the model determines weights based on predicted engagement probabilities, and the filter removes ads having a predicted engagement probability below a threshold engagement probability. The prediction module 500 may predict probabilities of multiple engagement categories, so the filtering module 400 may have multiple filters corresponding to different prediction models for different engagement categories. For example, the filtering module 400 may apply filters corresponding to predicted probabilities of preferred engagement categories. For instance, an advertiser indicates a preference for monetization and follow engagements through the advertiser frontend module 115, so the filtering module 400 filters candidate messages with a predicted monetization engagement probability or a predicted follow engagement probability lower than 0.2.

V.E. PRE-FILTERING Low RANKING CANDIDATE MESSAGES

Figure 4E:
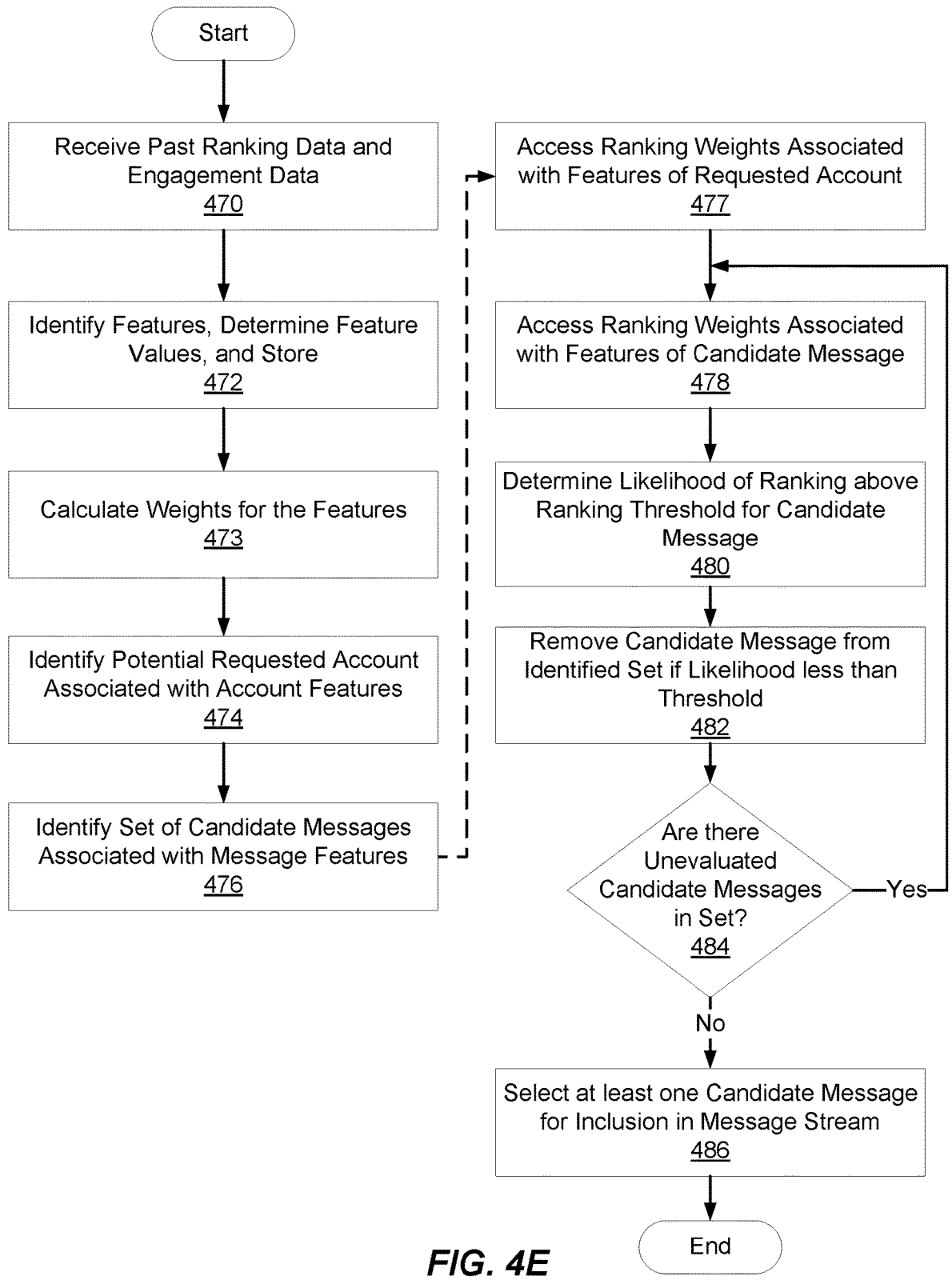
FIG. 4E illustrates an example flow chart of a process for streamlining personalization of a message stream based on an estimate of candidate message rankings, according to one embodiment.

FIG. 4E illustrates an example flow chart of a process for streamlining personalization of a message stream based on an estimate of candidate message rankings, according to one embodiment. The ranking prediction filter 460 receives 470 past ranking data for candidate messages for selection and inclusion in the message streams of account holders. The targeting module 300 receives prior ranking data representing past rankings of candidate messages for account holders. These past rankings were used to select one or more candidate messages to present in message streams associated with the account holders. The targeting module 300 uses the received engagement data to identify 472 account features and candidate message features and to determine values of the identified features based on message content, message metadata, and/or external data sources, for example. Based on the received ranking data and features, the ranking prediction filter 460 calculates 473 account ranking weights and message ranking weights for the account features and message features. These ranking weights may be stored (e.g., in the account repository 146).

The frontend module 110 receives a request from a client 105 for a message stream. The ad module 120 identifies 474 the requested account holder of the requested message stream. The targeting module 300 determines the features associated with the requested account holder based on engagement data for the account holder. The targeting module 300 identifies 476 a set of candidate messages for potential inclusion in the message stream of the requested account holder. The ranking prediction filter 460 then accesses 477 account ranking weights for the account features associated with the requested account holder.

For each candidate message, the ranking prediction filter 460 accesses 478 message ranking weights for the candidate message features. Based on the account ranking weights and the message ranking weights, the ranking prediction filter 460 determines 480 a likelihood of the candidate message ranking above a ranking threshold when the ranking is performed by the ranking module 600 for the requested account holder. The ranking prediction filter 460 removes 482 the candidate message if the determined value is less than a threshold likelihood value. If 484 there are unevaluated candidate messages in the set, then this process repeats for those other candidate messages under consideration. Eventually, the ranking module 600 selects 486 at least one of the candidate messages for inclusion in a message stream of the requested account holder.

VI. Prediction

Figure 5A:
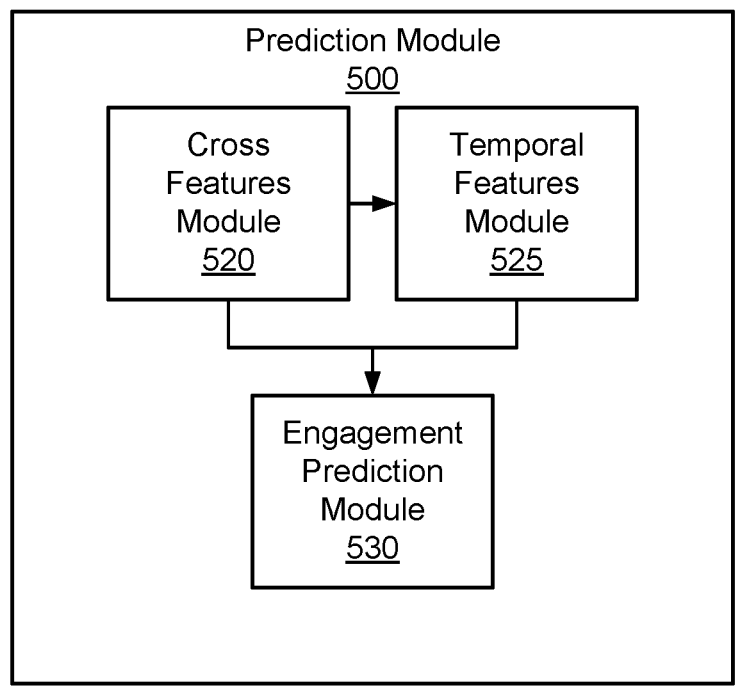
FIG. 5A illustrates a block diagram of an example prediction module in the ad module, according to one embodiment.

FIG. 5A illustrates a block diagram of the prediction model 500 in the ad module 120, according to one embodiment. The prediction module 500 includes a cross features module 520, a temporal features module 525, and an engagement prediction module 530. In various alternative embodiments, the functionality of these modules may be provided by a different grouping of modules, which may include duplicates of one or more modules.

As introduced above, the prediction module 500 determines the likelihood of engagement with each of a set of candidate messages assuming each candidate message is placed in the message stream of the requested account. To do this, the prediction module 500 accesses features associated with messages, accounts, and ad campaigns, as determined by the feature extraction module 310 of the targeting module 300. The prediction module 500 uses these accessed features to derive further features. Specifically, the cross features module 520 uses message and account features to derive cross features between pairs of accounts and candidate messages. Cross features may also be derived between account-ad campaign pairs, or account-advertiser pairs. These cross features represent an account's knowledge and previous experience with a particular candidate message, ad campaign, or advertiser. The temporal features module 525 derives temporal features from message, account, ad campaign, and cross features. These temporal features represent the time-dependent behavior of accounts engaging with ad campaigns using messages.

The engagement prediction module 530 uses the message features, account features, ad campaign features, cross features, and temporal features to model and predict, respectively, the likelihood of engagement with candidate messages in the message stream of the requested account.

VI.A. Account-Ad Cross Features

The cross features module 520 associates an account-candidate message pair with a cross feature based on message features, account features, or ad campaign features generated by the targeting module 300. Additionally, cross features may be based on previous engagements or impression data between an account and a candidate message (as retrieved from the engagement or impression repositories 152 and 154). Finally, the cross features module 520 may determine cross features that reflect connection data (retrieved from the connection graph repository 142). Cross features are features that represent an individual account's potential interest, relationship, and/or history with a particular candidate message. A cross feature may be determined based on one or more correlations between inferred interests of the requested account holder and topics of a candidate message. For example, suppose a candidate message has message features indicating that the message relates to soap, kitchens, and sunlight. In this example, if the account has in interest in soap, kitchens, and/or sunlight, then the cross features module 520 may associate the account-candidate message pair with a cross feature indicating an interest correlation. The example cross feature may have a binary value (e.g., whether the account is interested in more than a threshold number of topics in the candidate message), or the cross feature may have a non-binary value (e.g., how many interests of the account coincide with topics present in the message).

A cross feature may be determined based on an inferred location of the requested account holder and a message location associated with the candidate message (including the ad campaign and advertiser of the candidate message). Another example cross feature between an account and a candidate message has a value equal to a geographic distance between a location inferred for the account and a location of the advertiser account (e.g., a store location). This cross feature may reflect whether the account and the advertiser are geographically proximate. A cross features may be determined based on a correlation between an account feature and a message feature, where the message feature is a targeting criteria (e.g., demographics, device type of client 105, software type of client 105) specified by an advertiser account that authored the candidate message. As an example, a cross feature is associated with a correlation between a candidate message feature indicating a preferred client device type (as specified by the authoring advertiser, e.g., a smart phone) and an account feature indicating a preferred client device type. The example cross feature indicates whether the account may receive the candidate message using the mutually preferred client device type.

Cross features may indicate a potential relationship (e.g., interactions such as engagements, impressions, or connections) between an account and a candidate message, based in part on data from the fatigue map 450. For example, a cross feature indicates whether the account has previously engaged with a candidate message, and may also indicate the category of engagement (e.g., positive, negative). As another example, a cross feature indicates whether the account follows the advertiser account that authored the candidate message. As a final example, a cross feature indicates whether an account has received an impression of a message mentioning the advertiser's brand (or the cross feature indicates how many impressions the account has seen of messages containing the advertiser's brand).

The cross features module 520 may determine cross features based on connections of the requested account and/or the connections of an advertising account associated with a message. As an example, a cross feature indicates a number of other accounts that the requested account follows that also follow the advertiser account of a message. Another example cross feature indicates a number of other accounts that subscribe to the advertiser account and that subscribe to the requested account. The cross features module 520 may determine cross features that reflect engagements of accounts connected to the requested account. For example, a cross feature indicates a number of engagements between follower accounts of the requested account (or accounts that the requested account follows) and candidate messages authored by the advertiser account associated with a message. As another example, a cross feature is based on a number of engagements between follower accounts of the requested account (or accounts that the requested account follows) and messages that contain one or more topics in common with the candidate message. Hence, cross features may be based on connection data of the requested account.

It should be noted that many (if not all) account-candidate message cross features may also have an equivalent account-ad campaign or account-advertiser cross feature corresponding to the ad campaign and advertiser associated with the candidate message. Because the number of possible pairings between the accounts and candidate messages on the message platform is very large, determining cross features for all possible pairings may computationally expensive, and storing them may involve vast repositories. In one embodiment, the cross features module 520 may determine cross features for a limited number of candidate messages paired with an account in response to a request to limit the computational time and/or memory involved.

VI.B. Temporal Features

The temporal features module 525 associates temporal features with message platform data such as accounts, messages, account-message pairs, ad campaigns, and advertisers. Temporal features encapsulate the temporal properties of data received by the message platform.

The temporal features module 525 may determine example temporal features based on timestamps of account activity (e.g., logins, impressions, engagements) according to temporal criteria. Example temporal criteria includes rolling or recent time periods (e.g., within the last hour, day, week or month) and discrete or recurring time periods (e.g., 1-2 pm on Tuesday, Mar. 13, 2013, during mornings, weekends, evenings, the month before Christmas). Module 525 may extract this data directly from repositories 152 and 154. Example temporal features capture how many logins an account has over periods of the last day, the last month, and the last year. Other example temporal features capture how many engagements a candidate message or ad campaign has received during the morning, afternoon, evening, and night. In a different example, a restaurant account may have two temporal features, corresponding to the number of engagements mentioning the restaurant account on weekends and weekdays, respectively. In this example, the weekend temporal feature has a higher value indicating higher account interest in restaurants than the weekday temporal feature does. Example temporal features associated with an account-candidate message pair indicate the number of engagements between the account and that advertiser during the last week, last three days, or last three hours.

Using timestamps, the temporal features module 525 may sort the data used to determine a feature by different time periods, each corresponding to a temporal feature. This sorted data may be used to infer temporal account features representing an inferred attribute of an account (e.g., a location, an interest, a device type of client 105, a software type of client 105). As an example, the temporal features module 525 considers an account feature representing interest in food and segments the messages used to infer interest by times of the day (e.g., early morning, late morning, early afternoon, late afternoon, evening, night). From each segmented set of messages in the example, the temporal features module 525 infers a temporal feature corresponding to the account's interest in food during the time period. In this example, the temporal features for account interest in food have higher values during the late morning and late afternoon.

As another example, the temporal features module 525 determines temporal features that are also cross features. Suppose an account has features indicating interest Usain Bolt, sprinting, and the summer Olympics based on prior messages and engagements. These features of the candidate message and account do not have a temporal component, even though the underlying data does. The temporal features module 325 is capable of parsing the underlying engagements and messages that generated the features in order to determine temporal features corresponding to different time periods (e.g., winter, spring, summer, and fall time periods) where the account has interest into those topics. Further suppose a candidate message has features associated with the same topics (Usain Bolt, sprinting, and the summer Olympics). The temporal features module 525 is capable of combining the temporal features associated with the account's interest in those topics with the candidate message's interests in those topics to generate a set of cross features representing a match between the account's interest and the candidate message for different time periods. For example, if account interest peaks in the summer, and the candidate message is part of an ad campaign running during the summer, an associated temporal feature for the account-candidate message may have a value of 1 during the summer season.

The temporal features module 525 may determine temporal features using fatigue maps from the fatigue map module 450. To generate such features, module 525 accesses the fatigue map for an account holder and makes determinations with reference to comparative logic associated with each feature. The module 525 can resolve these comparative logic functions by processing the fatigue map using the comparative logic and at least one of an account holder entry from repository 146 and an candidate message entry, ad campaign entry, and/or an advertiser entry from the ad repository 148 as input. Examples of comparative logic for different temporal features include the computer code of: "has the account holder received an candidate message today?" and "has the account holder received more than three candidate messages from the same advertiser in the last hour?" The module 525 can determine other temporal features by determining the fatigue score for an account holder with respect to a particular candidate message, ad campaign, or advertiser.

Hence, temporal features provide a more granular perspective on engagement data, impression data, inferred account features, and inferred correlations between candidate messages and accounts than message features, account features, ad campaign features, or cross features do on their own.

VI.C. Engagement Prediction Model

Using the features generated by the feature extraction module 310 and the prediction module 500, the engagement prediction module 530 creates a model of engagement between the candidate messages and the requested account. The engagement prediction module 530 uses this model to predict the likelihood that an account holder, including either the requested account holder or another account holder viewing the message stream of the requested account holder, will engage with each candidate message.

To create the model, module 530 considers previous candidate messages published in message streams of various account holders, and subsequent engagements with those candidate messages to determine weights of the various features associated with those entities. In one example model based on logistic regression, the likelihood of an engagement with one of the candidate messages is determined according to:

$$p(E|\vec{x}) = \frac{1}{1+e^{-\vec{w}\cdot\vec{x}}} \quad (8)$$

where E is an engagement (or category thereof), $\vec{x}$ is a set of features corresponding to the candidate message features (and/or ad campaign features and advertiser features), account features, cross features, and temporal features, $p(E|\vec{x})$ is the likelihood of an engagement E given the set of features $\vec{x}$, and $\vec{w}$ is the set of weights corresponding to the set of features X. The likelihood of engagement may also be referred to as pCTR. The likelihood is determined from a logistic function applied to the dot product (e.g., inner-product) between the set of features (e.g., a features vector of the values of message features, account features, cross features, temporal account features, temporal message features, and/or temporal cross features) and the set of weights (e.g., a weights vector of account weights, message weights, cross weights, temporal message weights, temporal account weights, and/or temporal cross weights).

To determine the set of weights $\vec{w}$ corresponding to the features $\vec{x}$, a logistic regression may be performed according to:

$$\ln\left(\frac{\vec{y}}{1-\vec{y}}\right) = \vec{w}X \quad (9)$$

where $\vec{y}$ is a set of prior engagement probabilities given various feature sets, X is a set of feature sets, and $\vec{w}$ is a set of weights corresponding to the features. Each of the engagement probabilities is determined based on previous engagement data for a given combination of features. For example, $\vec{y}$ is a column vector having entries each corresponding to prior engagement probabilities for different sets of feature values $\vec{x}$, $\vec{w}$ is a row vector having entries each corresponding to a feature, and X is a matrix having a row of features corresponding to each entry of $\vec{y}$. In the example, each column of X corresponds to a feature and that feature's weight for various sets of feature values. The regression seeks to find a set of weights that predict the probability of engagement given a known set of features. The module 530 may perform the regression using multivariate techniques to substantially minimize a measure of error between the model of engagement and the retrieved engagement data (e.g., least squares fitting, relative-cross entropy minimization).

The engagement prediction module 530 may ignore impression/engagement data where an account is presented with a message but no engagement occurs. Instead, the engagement prediction module 530 determines prior engagement probabilities $\vec{y}$ based on engagements of a given type i (or category) relative to a total number of engagements including other types of engagements according to:

$$\vec{y} = \frac{\sum E_i}{E_{total}} \quad (10)$$

where $\vec{y}$ is an engagement probability, $E_i$ is the number of engagements of type i, and $E_{total}$ is the total number of received engagements. When the model predicts the likelihood of a category of engagements, the sum represents an optional sum over all engagement categories i in that engagement category. For example, if the engagement prediction module 530 is considering "follow" engagements, then the probability of a follow engagement given a set of features is the number of follow engagements from account-message pairs having that set of features divided by the number of non-follow engagements from account-message pairs having the same set of features. It should be noted that the engagement prediction module 530 may create different models of engagement for different engagements and/or engagement categories. For example, different weights are determined for a model predicting engagements in the performance category in contrast to a model predicting engagements in the monetization category.

The engagement prediction module 530 can determine the model based on engagement data between accounts and messages including non-candidate messages, even though the model is typically used to predict engagement between accounts and ads. However, the engagement prediction module 530 may also emphasize engagements between candidate messages and accounts, or exclude non-candidate messages from the model altogether. For example, the engagement prediction module 530 uses the ratio of equation 10 to compute engagement probabilities with the modification that engagements with candidate messages are counted multiple times while engagements with non-candidate messages are counted once.

Consider example engagement and feature data illustrated in Table 2:

TABLE 2

| Feature Sets $\vec{x}$ | Features | | | | | | Engagement Probability $\vec{y}$ |
|---|---|---|---|---|---|---|---|
| | Climbing Ad | Outdoor Enthusiast | Account Interests Match Ad Topic? | Recent Logins | Total Engagements | Monetization Engagements | |
| Account A | N/A | 0.9 | N/A | 14 | 100 | 40 | 0.4 |
| Candidate message B | 1 | N/A | N/A | N/A | 1250 | 250 | 0.2 |
| Account C with Candidate message D | N/A | N/A | 0 | N/A | 20 | 2 | 0.1 |
| Account D | N/A | 0.2 | N/A | 4 | 80 | 50 | 0.625 |
| Account E with Candidate message F | N/A | N/A | 1 | N/A | 5 | 2 | 0.4 |

Table 2 indicates five example sets of feature data demonstrating feature values as well as their corresponding probability of an example engagement (e.g., an engagement in the positive engagement category). Each of the example feature sets comprises engagement data between an account and an candidate message. The example features include a message feature with a value indicating if the message discusses climbing and an account feature with a value indicating the probability that an account is interested in the outdoors. The example feature set also includes a cross feature "account interests match ad topic?" with a binary value indicating if there is a match between at least one message feature indicating message content and at least one account feature indicating interests, based on a threshold of account interest. The last example feature is a temporal feature indicating recent logins over a temporal period (e.g., the last three days). The engagement probability computed for each feature set indicates probability of a monetization engagement out of total engagements by the account or with the message. The engagement prediction module 530 determines four example weights, one corresponding to each feature. Since the number of example feature sets (five) is greater than the number of example weights, a regression is used to minimize the discrepancy between the determined weights and the feature and engagement data.

It should be noted that the number of possible feature sets is very large, so the computational cost of determining model weights may be very high. To reduce computational costs, the engagement prediction module 530 may group similar engagement data from sufficiently similar feature sets (e.g., a measure of similarity such as the Jaccard similarity coefficient between the feature sets is greater than a threshold). In one embodiment, the engagement prediction module 530 determines the model weights as a batch or offline process using the data from the repositories 140, 142, 146, 148, 152, 154 and stores the determined model weights for use by the engagement prediction module 530. The engagement prediction module 530 may incrementally adjust model weights in response to additional engagement data. Such incremental adjustments may be done substantially in real time after additional engagement data is received, or periodically (e.g., nightly). For example, if an account with a feature indicating residence in Portland reposts an candidate message for a clown school, then the engagement prediction module 530 increases a weight values corresponding to the Portland account feature, the clown school message features, and a Portland-clown school cross feature. These updated weights are used in a model to predict repost engagements, for example.

As an example, suppose that an account-message pair is associated with an account feature indicating an inferred age of 18-24 for the requested account, a cross-feature indicating a common location between the requested account and the message, an account feature indicating frequent engagement with messages by the requested account, and a temporal feature indicating low exposure of the requested account to candidate messages over the last week. In this example, these features are associated with higher probability of a follow engagement according to a model of follow engagements, so they have high weight values $\vec{w}$. Continuing the example, the requested account has positive values for these features $\vec{x}$, so the computed value of $p(E|\vec{x})$ for the candidate message is relatively high. Consider the same account-message pair example in the context of an example model of monetization engagements (e.g., an application purchase). In this example, the inferred age feature may be associated with a reduced probability of a monetization engagement, so the weight value $\vec{w}$ corresponding to the age of 18-24 is lower for the monetization engagement model than it is for the follow engagement model. Hence, in the example, the computed value of $p(E|\vec{x})$ between the candidate message and the requested account is lower for the monetization engagement model than for the follow engagement model.

In an alternative embodiment, the engagement prediction module 530 may be used to predict engagement between a requested account and a non-candidate message. For example, an advertiser may, through an interface of the advertiser frontend module 115, identify a model account to target and then submit various non-candidate messages. The engagement prediction module 530 may determine the probability of engagement for the submitted messages, so the advertiser may select to broadcast the message with the best likelihood of engagement. As an extension of the previous example, the engagement prediction module 530 determines the probability of engagement between a message and a set of accounts (e.g., the followers of an advertiser account).

The ranking module 600 uses the determined engagement probabilities to rank and select one or more of the candidate messages for inclusion in the requested message stream.

VI.D. Message Stream Personalization Using Engagement Model

Figure 5B:
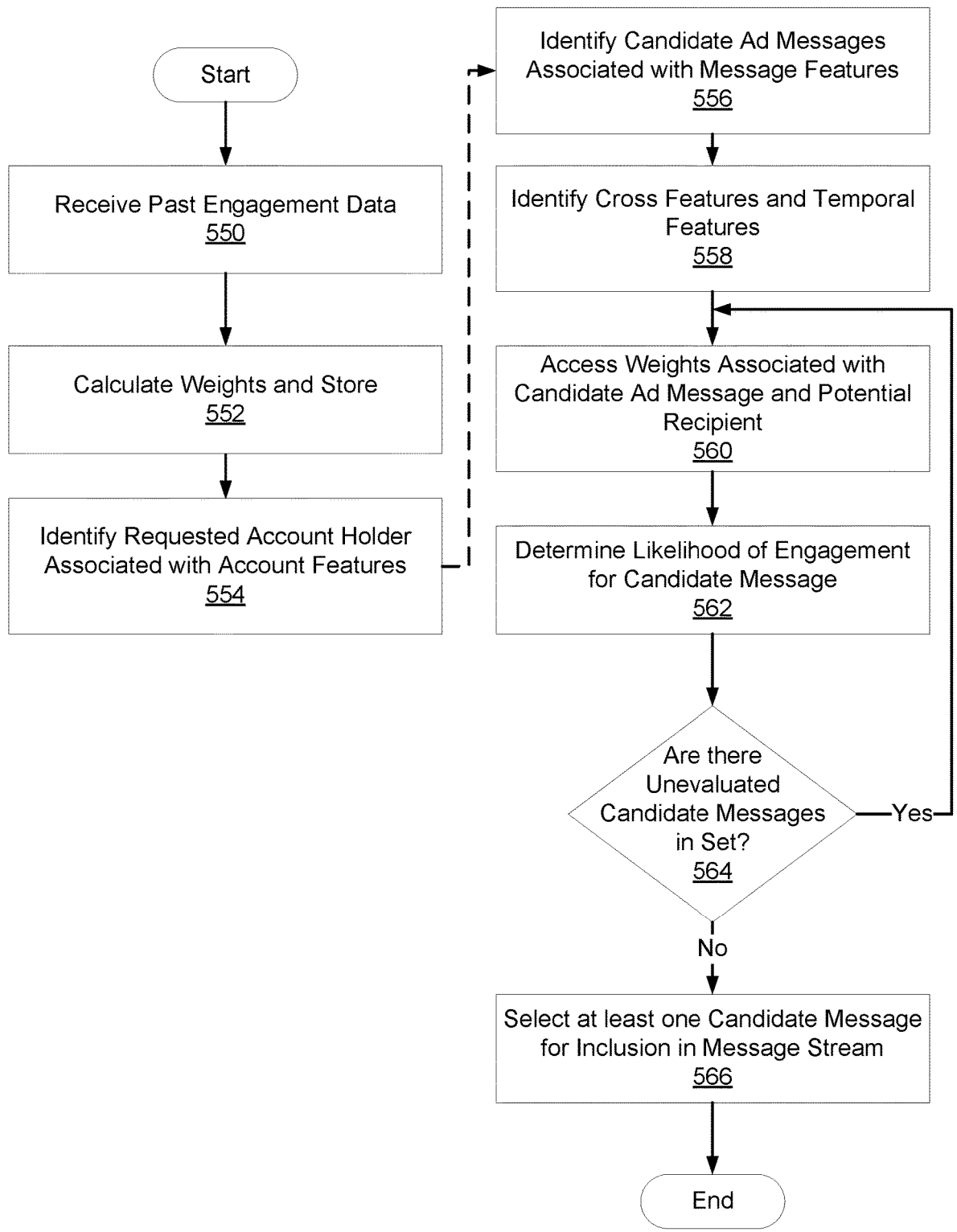
FIG. 5B illustrates an example flow chart of a process for personalizing a message stream, according to one embodiment.

FIG. 5B illustrates an example flow chart of a process for personalizing a message stream, according to one embodiment. The frontend model 110 receives 550 engagement data representing past engagements by account holders with messages present in the message streams of other account holders. The engagement data may be time stamped. Based on the engagement data, the targeting module 300 and prediction module 500 determine message features, account features, and cross features. Based on the received engagement data, the engagement prediction module 530 calculates 552 weights (e.g., account weights, message weights, cross weights) for the features and stores them (e.g., in the associated repository from FIG. 1). The engagement prediction module 530 may also calculate temporal weights (e.g., temporal account weights, temporal message weights) based at least in part on timestamps associated with the engagement data.

The frontend module 110 receives a request from a client 105 for a message stream. The ad module 120 identifies 554 the requested account holder associated with the client request. The identified account is associated with one or more account features, which the targeting module 300 determines based on engagements with messages, authored messages, and connected accounts, for example. The targeting module 300 and/or filtering module 400 identify 556 a set of candidate messages for possible inclusion in the requested message stream. These candidate messages (typically candidate messages in one embodiment) are associated with message features, which the targeting module 300 determines based on content or metadata of the candidate message and/or external data sources, for example. The engagement prediction module 530 may also identify 558 cross features and temporal features, determine weights for those features, and store them.

For each candidate message of the set, the engagement prediction module 530 accesses 560 weights and features associated with the candidate message and the requested account. Based on the feature values and weights (e.g., account features, candidate message features, ad campaign features, or advertiser features), and in some instances cross features and temporal features), the engagement prediction module 530 determines 562 a value representing a likelihood of engagement with the candidate message in the message stream of the requested account holder. If 564 there are unevaluated candidate messages in the set of candidate messages, then this process is repeated for the remainder of the candidate messages in the set. The ranking module 600 then selects 566 at least one of the set of candidate messages for inclusion in the message stream of the requested account holder based on the determined value.

VII. Rankings

Figure 6A:
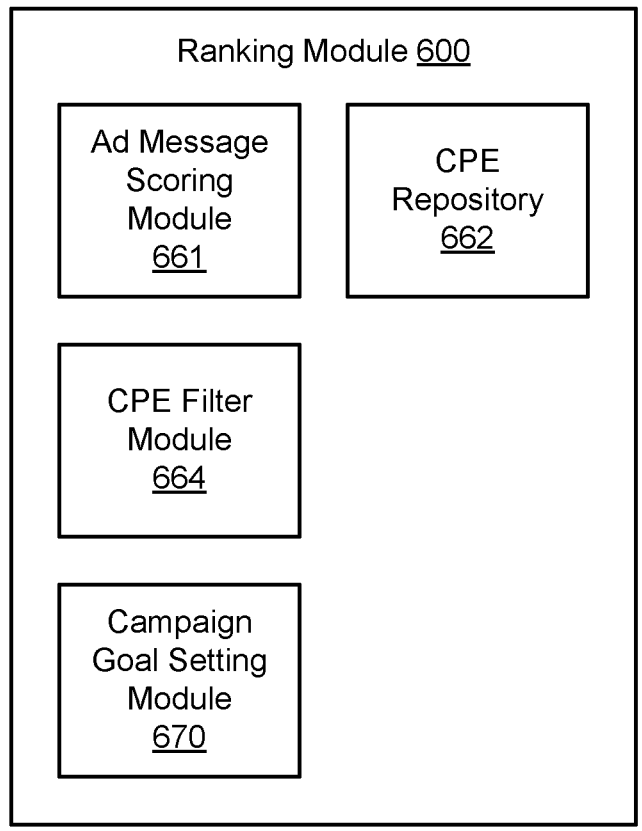
FIG. 6A illustrates a block diagram of an example ranking module in the ad module, according to one embodiment.

FIG. 6A is a block diagram of the ranking module 600 in the ad module 120, according to one embodiment. The ranking module 600 includes an ad scoring module 661, a cost per engagement (CPE) repository 662, a CPE filter module 664, and a campaign goal setting module 670. The ranking module 600 ranks the candidate messages that survive filtering to assist the messaging platform 100 in deciding which candidate messages are selected for inclusion in a requested message stream. In various embodiments, additional and/or different modules may be used to perform the functions provided by the ranking module 600.

VII.A Ranking Based on Likelihood of Engagement

To perform the ranking, the candidate message scoring module 661 receives a filtered set of candidate messages from the filtering module 210. The candidate message scoring module 661 determines a rank value for each of the candidate messages and ranks the candidate messages according to the rank values. A subset of the candidate messages are selected based on the generated rank values of the candidate messages. Then, the selected candidate messages are served to one or more account holders, the one or more account holders including the account holder associated with the received request. For example, the candidate messages can be a top percentage of the ranked candidate messages, candidate messages with at least a threshold rank value, or any other suitable subset of the filtered candidate messages.

A rank value for an candidate message is a predicted estimate of a value for an advertiser for presenting the candidate message to account holders. The value can be determined based on a plurality of factors including a bid associated with the candidate message. A bid associated with an candidate message is an amount the associated advertiser is willing to pay per engagement with the candidate message. Thus, a higher bid associated with the candidate message can indicate that the candidate message is worth more to the advertiser and, therefore, the value can be higher for a higher bid.

The value can also be determined based on the likelihood of engagement as determined by the prediction module 500, further described above. In the same or a different embodiment, the value can be determined based on the likelihood of one or more different categories of engagements with the candidate message. Engagement categories include positive engagements, negative engagements, monetizable engagements, performance engagements, follow engagements, and any other suitable category of engagement that can be received by the messaging platform 100 described in modules 530 FIG. 5A. The likelihoods for these different engagement categories can be based on data stored in the engagement repository 152, the impression repository 154, or as a result of the analytics module 700. In addition, the likelihoods of engagement categories can be determined by the engagement prediction module 530.

In one embodiment, the rank value of an candidate message can be calculated according to:

$$RS = bid * pGlobalPos \qquad (11)$$

where RS is the rank value and pGlobalPos is any engagement received by the candidate message that is considered a positive engagement to the advertiser associated with the candidate message. For example, positive engagements include following an account associated with the candidate message, clicking on a link associated with the candidate message, or any other suitable consumption action taken by the account holder served the candidate message. In various embodiments, the rank value is the bid times any other engagement received by the candidate message and may not necessarily be considered a positive engagement to the advertiser.

In another embodiment, the rank value of an candidate message is calculated according to:

$$RS=\alpha*(bid*pMon^\beta)+\gamma*pPos-\delta*pNeg+\varepsilon*pPerf+ *\zeta*pFollow-\eta*PIC \quad (12)$$

where pMon is a likelihood of the candidate message receiving a monetizable engagement, pPos is a likelihood of the candidate message receiving a positive engagement, pNeg is a likelihood of the candidate message receiving a negative engagement, pPerf is a likelihood of the candidate message receiving a performance engagement, pFollow is a likelihood of the candidate message receiving a follow engagement, and PIC stands for a progressive impression cost and represents the progressive impression cost of the candidate message so far in the messaging platform 100. The PIC can be the log of the total number of engagements received by the candidate message so far by account holders of the messaging platform 100. Each of these likelihoods is determined similarly to the determination of the likelihood of engagement generally (e.g., across all engagement categories), as described above with respect to the prediction module 500.

The variables $\alpha$, $\beta$, $\gamma$, $\delta$, $\varepsilon$ and $\zeta$ are weights for each of the factors listed and can be based on information associated with the account holder who will be served the candidate message, a client 105 used by the account holder, geographical information of the account holder, temporal information of the account holder, or any other suitable information that affects performance of the candidate message when served to the account holder. The variable $\eta$ is a weight for the PIC factor and can be based on information associated with the advertiser associated with the candidate message.

The variables can also be advertiser specific and be based on information stored in the engagement and impression repositories 152 and 154. The variables can also be based on a minimum cost per engagement (CPE) the advertiser has specified. The CPE is an amount an advertiser is willing to pay the ad module 120 for a served candidate message receiving any engagement, regardless of category or type. CPEs are useful to the advertiser because the advertiser only pays for engagements and not impressions of served candidate messages. For example, an advertiser would pay for an account holder to click on a served candidate message, not for an account holder to view and scroll past a served candidate message in the message stream.

VII.B Ranking Based on a Reserve Cost Per Engagement

The ad module 120 can also assign a reserve CPE for advertisers, candidate messages, or ad campaigns. The reserve CPE can be specific to different types of candidate messages, advertisers, or ad campaigns. reserve CPEs can also be based on historical data of engagements with previously served candidate messages stored in the engagement repository 152 or predicted engagement rates with the candidate messages, as determined by the prediction module 500. Reserve CPEs can be accessed from the CPE repository 662. The CPE filter module 664 filters candidate messages based on rank values associated with the candidate messages and reserve CPEs associated with the candidate messages. For example, if a reserve CPE is associated with an candidate message, the reserve CPE can decrease over time as engagement rate of the candidate message increases. If engagement rate increases for an advertiser's candidate messages, the advertiser does not need to bid at a high reserve CPE to maintain the engagement rate. Thus, by lowering the reserve CPE of an candidate message with high engagement, the candidate message can be served at a slower rate over a longer period of time (i.e., the entire day) and other candidate messages with slower engagement rates have a chance of outbidding the candidate message with a high engagement rate. If a reserve CPE is associated with an advertiser or ad campaign associated with the candidate message, the reserve CPE can decrease over time as engagement rates of the candidate messages associated with the advertiser or ad campaign increase.

For each candidate message, the CPE filter module 664 compares the rank value of the candidate message to a weighted reserve CPE associated with a type of the candidate message according to the relation $$RS_i \geq \omega*rCPE \quad (13)$$

where $\omega$ represents a tunable weight to control spend rate of an advertiser's budget throughout the day. If the rank value exceeds or is equal to $\omega*rCPE$, the candidate message is no longer considered to be served to the one or more account holders associated with the received request, where $RS_i$ is a rank value calculated for the candidate message and rCPE is a reserve CPE associated with a type of the candidate message. If the rank value is less than $\omega*rCPE$, the candidate message remains in consideration for ranking.

Weight $\omega$ can be varied so that advertisers do not quickly use up their entire budget before the end of the day due to increased spending on engagements that have a low cost per engagement. Thus, weight $\omega$ can vary for different types of candidate messages and can be based on information associated with an advertiser associated with the candidate message, a client 105 used by the account holder, geographical information of the account holder, temporal information of the account holder, or any other suitable information that affects performance of the candidate message when served to the account holder. For example, the CPE filter module 664 can adjust weight $\omega$ for an candidate message with a high engagement rate to increase the value of $\omega*rCPE$ and, therefore, serve candidate messages to account holders at a slower rate. This adjustment will allow for the advertiser associated with the candidate message to spend their budget at a slower yet more even pace throughout the day and, therefore, potentially access a more diverse set of account holders.

The adjustment of weight $\omega$ can also vary based on engagement rate of the candidate message. For example, if an candidate message is associated with a high engagement rate, then, to ensure that at least a specified number of candidate messages are served to account holders in a specified interval of time, weight $\omega$ can be adjusted at a rate that ensures that the rank value of the candidate message exceeds the value of $\omega*rCPE$ for at least the specified interval of time. Thus, the value of $\omega*rCPE$ will continue to decrease in the specified interval of time but will still not exceed the rank value of the candidate message.

As described above, the CPE filter module 664 compares a weighted reserve CPE of an candidate message to a rank value of the candidate message to determine whether to still consider the candidate message to be served to an account. Other similar implementations, however, can also be used that accomplish the same result. For example, the filtering module 400 can also compare a bid associated with an candidate message to the reserve CPE of the candidate message. If the bid exceeds or is equal to the reserve CPE, the candidate message is not filtered out and is analyzed in the prediction module 500 and ranked by the ranking module 600. If the bid does not exceed the reserve CPE, the candidate message is filtered out and removed consideration prior to prediction 500 and ranking 600. In this example, the CPE filter module 664 may be operated in or by the filtering module 400 rather than the ranking module 600.

In other embodiments, rather than ranking candidate messages, the candidate message scoring module 661 may rank ad campaigns or advertisers. In such embodiments, the principles of ranking described herein for ranking candidate messages are also applicable to ranking ad campaigns or advertisers. For example, such rankings may be determining by aggregating all individual candidate message data associated with an individual ad campaign or advertiser when determining the ranking of that ad campaign or advertiser, respectively. Rather than the bid being a price per engagement for an individual candidate message, the bid can represent a price the advertiser is willing to pay to place any candidate messages in the ad campaign in a message stream. Any probability of engagement discussed in the candidate message scoring module 661 can be for any candidate message in an ad campaign of an advertiser instead of for an individual candidate message. Similarly, the reserve CPE can be for any candidate message in an ad campaign and not for an individual candidate message.

VII.C Campaign Goal Setting

Generally, an advertiser pays the messaging platform 100 only for engagements and not impressions received by served candidate messages. The platform 100 allows advertiser to specify a bid (e.g., a maximum bid) and a set of one or more preferred engagement categories (i.e., follow engagements, click engagements, positive engagements, etc.) or high-level goals that are translated by the campaign goal setting module 670 into engagement categories., For example, an advertiser can specify a high-level goal to "optimize for traffic and conversions" and this high-level goal is translated into preference for performance engagements. The campaign goal setting module 670 weights bids based on the bid, the preferred engagement categories, and the likelihoods of those types of engagements occurring as determined by the prediction module 500. Module 670 may also decrease bids for engagements that are not preferred.

To implement an advertiser's expressed preferences, when determining the bid for one of the candidate messages of the advertiser, the campaign goal setting module 670 adjusts the advertiser's provided maximum bid (Bid) (or a throttled bid, as described above) to determine an effective bid (eBid). Module 670 determines the effective bid by modifying the maximum bid using a weight (ω) that is based on the preferred engagement categories. In addition to being a maximum bid, the bid can also be an engagement-specific bid or any other bid value specified by the advertiser for the candidate message. In one embodiment, the weight is a ratio in the range of 0 to 1 and the effective bid for the candidate message is determined based on:

$$eBid = \omega * Bid. \qquad (14)$$

In the ranking process, the determined effective bid would be used in place of the maximum bid to determine a rank value associated with the candidate message.

In one embodiment, the weight is equal to an engagement value for the candidate message. An engagement value represents how valuable serving the candidate message would be for the advertiser if a specific engagement category occurs with the served candidate message. In other words, the engagement value is an expected value of winning the auction for a candidate message, assuming at least one engagement occurs (e.g., throwing out all cases where no engagement occurs). Thus, if an advertiser prefers performance engagements rather than positive engagements, every performance engagement is worth 1, for example, and every nonperformance engagement is worth 0, following the example. Thus, the expected value of winning the auction for a candidate message is an expected number of performance engagements for the candidate message, assuming at least one engagement occurs. If the engagement value is 0.5, this means the candidate message has a 50% chance of receiving a performance engagement if served to an account, assuming an engagement of some type occurs. Value of serving a candidate message can be based on historical data of previous engagements with other candidate messages of the advertiser associated with the candidate message or pPerf (e.g., the likelihood of engagement as determined by prediction 500). In one example, if a first advertiser has candidate messages that have received more engagements than candidate messages of a second advertiser, the first advertiser does not need as high a bid for a candidate message as the second advertiser to receive an engagement with the candidate message. Therefore, the engagement value for the first advertiser's candidate message is lower than the engagement value for the second advertiser's candidate message.

The engagement value of an candidate message can also be normalized to a threshold engagement value. The threshold engagement value can be a maximum engagement value as specified by the campaign goal setting module 670 and can be set for all advertisers, can vary for each advertiser, or can vary for each engagement category associated with the engagement value. A downside of normalizing the engagement value to a threshold engagement value is that this may vary a previously specified threshold for bids (a maximum bid, engagement-specific bid, etc.), thus disrupting an advertiser's cost expectation. However, an advantage to normalizing is that the advertiser is more likely to pay an amount that reflects the value of the served candidate message.

In an alternative embodiment, the campaign goal setting module 670 only charges advertisers for engagements that are of a preferred category. In this embodiment, the advertiser can still receives the same number of engagements with the served candidate message as in the case where they pay for engagement generally, however to achieve this result the advertiser will generally need to agree to a significantly higher effective bid in order to ensure such a result. For example, a served candidate message may only receive one performance engagement for every ten received engagements in the messaging platform 100. In the ordinary case of paying per engagement, the advertiser may have set a maximum bid for engagements at $1. In an example scenario, the advertiser may pay for ten engagements, thus spending $10, but receiving only 1 preferred engagement. In contrast, in this embodiment, the advertiser would pay $10 per performance engagement. Continuing with the same scenario, they would only win one engagement and pay $10 for it, while paying for no other engagements. The cost is the same in the end to the advertiser. This embodiment is advantageous where lower volumes of candidate messages are desirable for the advertiser or for the messaging platform; whereas the ordinary pay-per-engagement embodiment is preferable where higher volumes of candidate messages are desirable for the advertiser or the messaging platform.

In another embodiment, the campaign goal setting module 670 can specify a target engagement value and determine the weight according to:

$$\omega = \min\left(1, \frac{engVal}{t\_engVal}\right) \quad (15)$$

where engVal is the engagement value and t_engVal is the target engagement value. For example, the target engagement value can be statistically assigned by the messaging platform 100 or advertiser based on previous engagements stored in the engagement repository 152. Else, the target engagement value can be determined similarly to how the campaign engagement value is calculated, as described next. By determining the weight based on equation 15, the campaign goal setting module 670 can set an upper bound on the effective bid. For example, the campaign goal setting module 670 can set the target engagement value so that the upper bound can be the bid specified by the advertiser for the candidate message.

In yet another embodiment, the campaign goal setting module 670 can determine the weight based on historical data associated with other candidate messages in the ad campaign of the candidate message. For example, a distribution of the historical engagement data (engagement values of other candidate messages in the ad campaign), can be made for the candidate message. Then, an engagement value associated with a specified (e.g., $90^{th}$) percentile of the distribution of the number of engagements (in some cases of a particular engagement category) that occurred can be set as a campaign engagement value and the weight can be determined according to:

$$\omega = \min\left(1, \frac{engVal}{c\_engVal}\right) \quad (16)$$

where c_engVal is the campaign engagement value. By determining the weight based on equation 16, the campaign goal setting module 670 can also set an upper bound on the effective bid for an candidate message but make the upper bound specific to the ad campaign associated with the candidate message.

VII.D Example Ranking Process

Figure 6B:
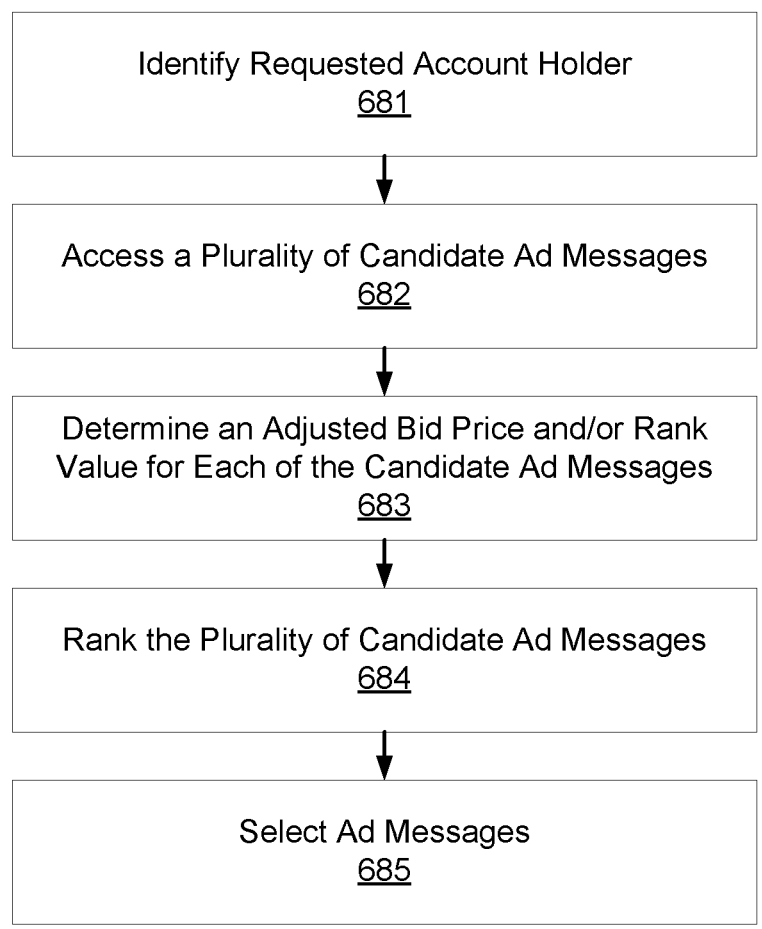
FIG. 6B illustrates an example flowchart of a process for determining adjusted bid prices of candidate messages, according to one embodiment.

FIG. 6B illustrates an example flowchart of a process 680 for determining adjusted bid prices of candidate messages, according to one embodiment. The frontend module 110 receives 681 a request for the message stream of an account holder. The ad module 120 identifies or accesses 682 a set of candidate messages in the messaging platform 100, each candidate message in the messaging platform 100 associated with a budget, a bid, and a preferred engagement category.

Ranking module 600 determines a remaining budget based on a time stamp, the budget, and a current outstanding spend associated with the candidate message. Ranking module 600 can also determine a throttling factor based on the time stamp and the remaining budget. Ranking module 600 can also filter the candidate messages based on a reserve CPE. The ranking module 600 can determine 683 an adjusted bid for the candidate message that is based on an expected value determined for the candidate message. The expected value is determined based on an expected number of engagements of the preferred engagement categories were the candidate message to appear as one of the published messages in the message stream of the requested account holder.

For each of the candidate messages, the ranking module 600 determines a rank value. The rank value is based on the bid, in some cases throttled or adjusted as described above, as well as a likelihood of future engagement with the candidate message were the candidate message to appear as one of the published messages in the message stream of the requested account holder. The candidate messages are ranked 684 based on the determined rank values and selected 685 for inclusion in the message stream of the account holder based on the rank values.

VIII. Analytics

Figure 7A:
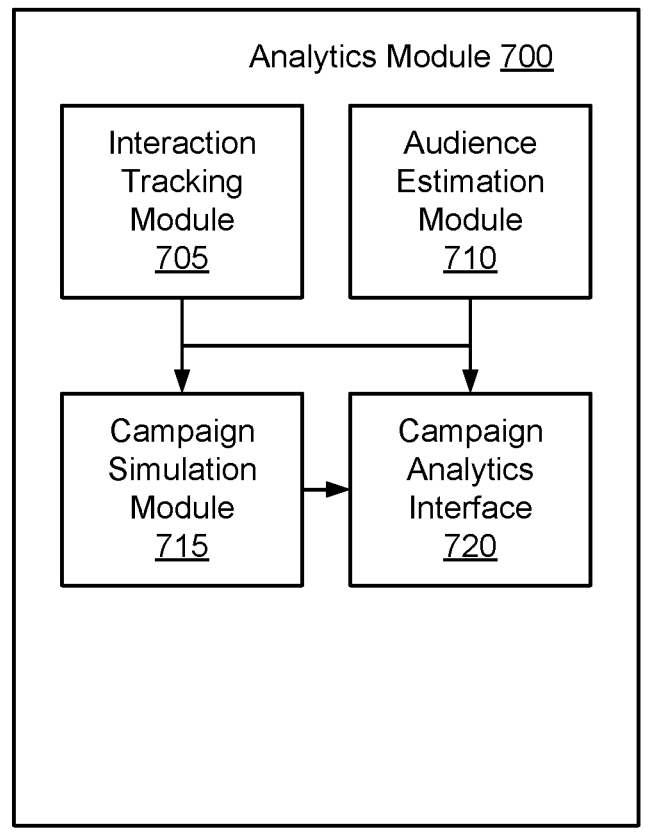
FIG. 7A illustrates a block diagram of an example analytics module in the ad module, according to one embodiment.

FIG. 7A illustrates a block diagram of the analytics module 700, according to one embodiment. The analytics module 700 includes an interaction tracking module 705, an audience estimation module 710, a campaign simulation module 715, and a campaign analytics interface 720.

VIII.A. Tracking Engagements

The interaction tracking module 705 derives interaction data from engagement and impression entries retrieved from the repositories 152 and 154, respectively. The term interaction data merely refers to any quantity derived from engagement and impression data. Interaction data is used by the campaign simulation module 715 and/or the campaign analytics interface 720. Example interaction data includes total interaction (e.g., engagement or impression) counts for an candidate message, an ad campaign, or an advertiser account. The interaction tracking module 705 may filter interaction data according to account targeting criteria (e.g., demographics, interests, gender, age, location, device, software, whether the accounts follow the advertiser account). The targeting criteria may also be used to segment the accounts into groups. In this case, module 705 counts the interactions for the accounts meeting the targeting criteria by group. Using these derived counts, the interaction tracking module 705 may normalize interaction totals for various groups of accounts by the total number of accounts in the group. These normalized interaction totals indicate an candidate message's performance in the targeted group relative to the group's presence on the messaging platform 100.

The interaction tracking module 705 may group interactions according to time (e.g., hourly, daily, weekday, weekend, seasonal). Using temporally grouped interaction data, the interaction tracking module 705 may normalize interactions based on interaction levels for a time period. For example, the interaction tracking module 705 isolates an ad campaign's interactions based on total interactions on the messaging platform to reveal when an ad campaign's receives more or fewer interactions relative to other interaction activity on the messaging platform 100.

The interaction tracking module 705 may manipulate computed interaction totals to reveal trends between different candidate messages. For example, the interaction tracking module 705 computes what percentage of an ad campaign's interactions an candidate message is responsible for (e.g., over time, across different targeting groups of accounts). The interaction tracking module 705 may combine interaction data for an candidate message with bid data for that ad to determine financial performance data about interactions including cost per engagement (CPE) or cost per impression (CPI).

VIII.B. Audience Size Estimation

The audience estimation module 710 estimate the size of an audience for an candidate message with respect to the accounts of the messaging platform 100. To do this, module 710 accesses a set of targeting criteria associated with the candidate message from the ad repository 148, and also accesses accounts from the account repository 146 that match the targeting criteria. Accounts matching targeting criteria can be determined using the account features determined by the targeting module 300, as described above.

To estimate audience size for an candidate message, module 710 estimates the number of accounts that meet all (or at least a threshold number) of the targeting criteria. For example, to estimate the number of accounts that meet the specified criteria, the audience estimation module 710 estimates the cardinality of the intersection of sets corresponding to the targeting criteria. To estimate cardinality of a set of accounts meeting a targeting criterion, the set of accounts may be randomly sampled to estimate the number of accounts in that set using techniques such as a hyper loglog or a Bloom filter. These techniques provide for estimation of set size with far less memory or processing required than an exact determination of set size. Similarly, the cardinality of the union of sets corresponding to various combinations of targeting criteria may be determined. Based on the estimated cardinalities of targeting criteria sets and the estimated cardinalities of the unions of targeting criteria sets, the audience estimation module 710 determines the cardinality of the intersection of the targeting criteria sets according to the inclusion-exclusion principle. The cardinality of this intersection of sets corresponds to the estimated number of accounts that meet the specified criteria.

For example, if an advertiser specifies targeting criteria such as an interest in hiking and a location in Portland, then there is a set A of accounts with an inferred hiking interest and a set B of accounts with a Portland location. The audience estimation module 710 estimates the cardinalities A* and B* of the hiking set A and the Portland set B, respectively. Additionally, the audience estimation module 710 estimates the cardinality (A∪B)* of the union of those sets (e.g., the number of account holders who live in Portland and/or enjoy hiking). The cardinality (A∩B)* of the intersection of those sets (e.g., the number of account holders who live in Portland and enjoy hiking) can be determined from the following equation corresponding to the two-set case of the inclusion-exclusion principal:

$$(A \cap B)^* = A^* + B^* - (A \cup B)^* \qquad (17)$$

The cardinality (A∩B)* By indicates the number of accounts that meet the specified targeting criteria. The advertiser frontend module 115 may present the estimated number of accounts to an advertiser and update the estimate in response to various selections of targeting criteria. The methods described herein may be used with targeting criteria besides user features. For example, one targeting criterion could correspond to a set of users who have respective accounts similar to accounts that follow the advertiser account. Hence, the audience estimation module 710 provides feedback to advertisers about the potential audience size of ad campaigns.

VIII.C. Campaign Simulation

The campaign simulation module 715 simulates a test candidate message to determine how many impressions or engagements the test candidate message is expected to receive based on a bid for the test candidate message, targeting criteria for the test candidate message, a budget for the test candidate message, and based on historical impression or engagement data from the engagement repository 152. The advertiser frontend module 115 presents the estimated engagements and impressions from the simulation to an advertiser.

To simulate the performance of the candidate message, the campaign simulation module 715 samples one or more accounts from the set of accounts having features meeting the specified targeting criteria (or more than a threshold of targeting criteria). The prediction module 500 predicts the likelihood of engagement for the sampled accounts with the test candidate message. The ranking module 600 then uses the engagement likelihoods as well as a bid amount to rank the test candidate message among other candidate messages available for inclusion in the message streams of the sampled accounts. Based on the simulated ranking among other candidate messages, the ranking module 600 determines a count of the number of instances where the test candidate message would be selected for inclusion in the message streams of the sampled accounts. This provides the expected number of impressions for the sample. Module 715 combines the expected number of impressions with the previously determined likelihoods of engagement for the sampled accounts that received impressions to determine the expected number of engagements for the sample. As the expected impression and engagement counts are based on a sampled subset of accounts matching the targeting criteria, module 715 may conduct a statistical analysis to estimate the total number of impressions and/or engagements the test candidate message would receive having expended the test budget. For example, estimated impressions are calculated from the number of sampled accounts that would receive the simulated candidate message divided by the total number of sampled accounts multiplied by the number of accounts that meet the specified targeting criteria (e.g., the audience size as determined by audience estimation module 710).

Based on the expected engagement and impression counts for the test candidate message, the campaign simulation module 715 may further estimate expected counts for different types and/or categories of engagements. For example, based on the average likelihoods of engagement for positive and monetization engagements, the advertiser frontend module 115 presents an advertiser with the expected number of positive and monetization engagements. Combining expected engagements or impressions with the bid amount, the advertiser frontend module 115 may also present an expected CPE or CPI. Alternatively or additionally, the campaign simulation module 715 uses heuristics in lieu of a full simulation in the ranking module 600 against other candidate messages. An example heuristic correlates the likelihood of engagement with a likelihood of selection for inclusion in a message stream. In one example embodiment, the ranking module 600 determines a score for the test candidate message based on the test candidate message's bid and one or more likelihoods of engagement (e.g., in different engagement categories). In this example embodiment, the campaign simulation module 715 estimates an average threshold score for inclusion in an account's content stream (e.g., based on previous message rankings for an account). Using the estimated average threshold score, the campaign simulation module 715 avoids scoring other messages unrelated to the simulated candidate message.

VIII.D. Analytics Interface

The campaign analytics interface 720 provides data about candidate messages, ad campaigns, or an advertiser account more generally to the advertiser frontend module 115. The campaign analytics interface 720 may provide data from the interaction tracking module 705, the audience estimation module 710, and the campaign simulation module 715. One example interface 720 provides engagement data for an candidate message as a function of time. The example interface may include data relating to various targeted account features (e.g., gender, demographics, interests, age, device, location). An advertiser account may filter engagement or impression data based on various combinations of targeting criteria. The analytics interface 720 may provide engagements per impression, CPI, or CPE, which may be displayed against a temporal axis or separated by selectable account features. Alternatively or additionally to providing analytics on a candidate message, the analytics interface 720 provides analytics relating to an ad campaign. For example, the analytics interface compares engagement and impression performance of various candidate messages in an ad campaign over time or for different accounts (e.g., grouped by account features).

Advertiser account data may focus on features of accounts that follow the advertiser account. For example, the analytics interface 720 may indicate geographic distribution or most popular interests of follower accounts. Other advertiser account analytics indicate when an advertiser account is a topic of a message broadcast through the messaging platform. For example, the analytics interface 720 may tracks mentions of keywords such as an advertiser's brand name or product names as well as slogans associated with an advertiser's campaign (e.g., on television, in print, through the messaging platform, through social media). The analytics interface 720 may present mentions over time or analyze mentions based on account features of accounts that have authored messages mentioning an advertiser account.

Figure 7B:
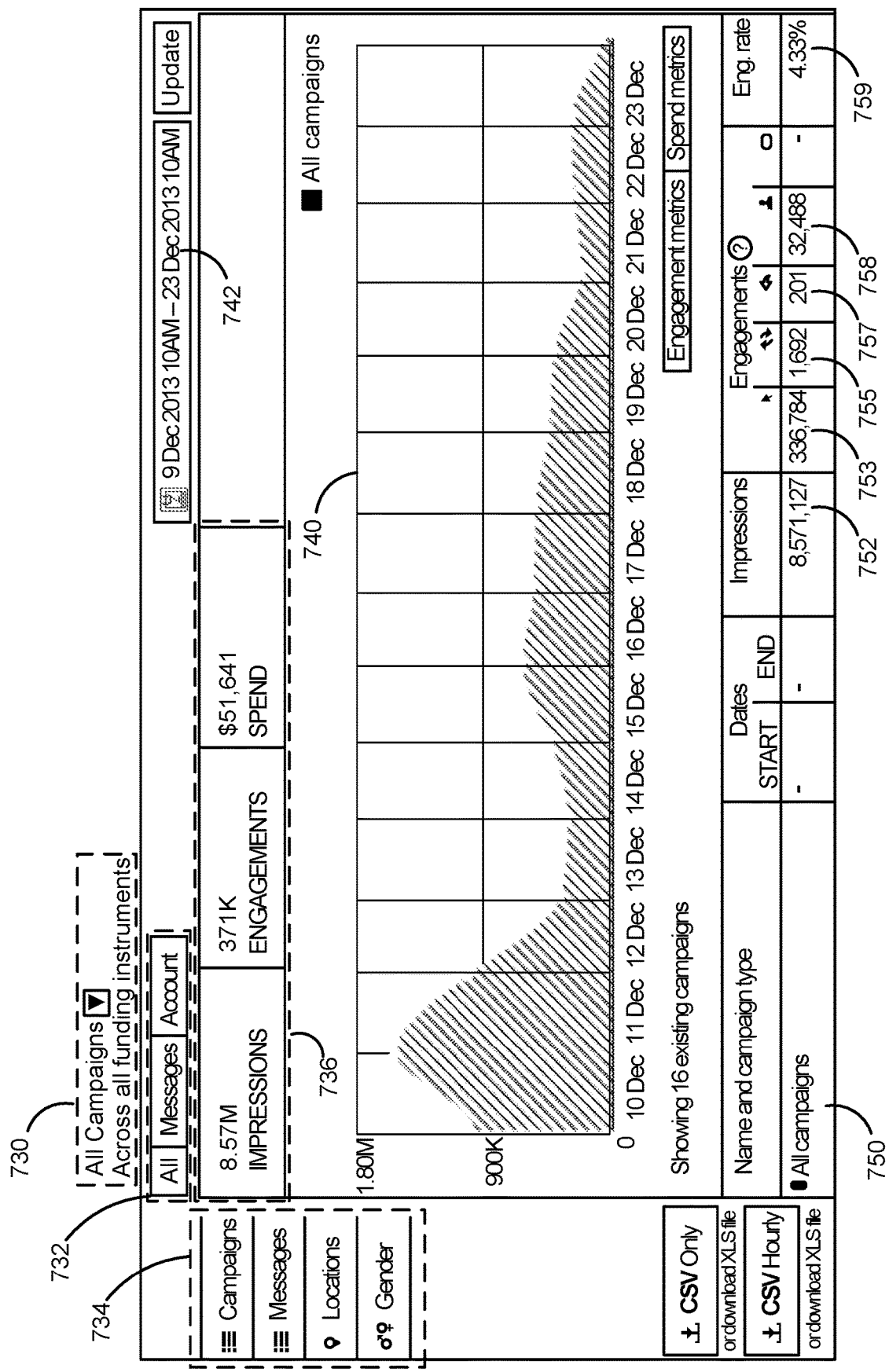
FIG. 7B illustrates an example user interface for advertisers, according to one embodiment.

FIG. 7B illustrates an example user interface for advertisers, according to one embodiment. The advertiser frontend module 115 presents an interface containing a campaign selector 730, which changes the provided analytics data to reflect one or more ad campaigns (including all ad campaigns, as illustrated). The mode selector 732 indicates whether message data, account data, or a combination thereof is presented. The segment selector 734 changes segmentation of the analytics data. For example, the advertiser may view the data on a campaign-by-campaign basis, as illustrated, or by particular candidate messages, locations, or genders. Data may be segmented by other inferred account feature not illustrated (e.g., interests, age, device). The segment summary 736 lists total impressions, engagements, and spending on the illustrated ad campaign. The segment timeline 740 provides a chart of impressions the campaign has received on the ordinate versus time on the abscissa. Selecting a different metric from the segment summary 736 changes the ordinate (e.g., to engagements or to spending). The timeline range 742 controls the range of times presented on the abscissa of the segment timeline 736. The campaign list 750 provides data on impressions and engagements on a total or a campaign-by-campaign basis. For example, the campaign list provides ad campaign impressions 752, URL click engagements 753, repost engagements 754, reply engagements 755, follow engagements 758, and engagement rate 759 (e.g., percentage of impressions that result in an engagement).

FIG. 7C illustrates an example user interface for viewing budget and spending data of an ad campaign, according to one embodiment. The advertiser frontend module 115 presents the illustrated user interface when an advertiser selects the campaign selector 730. The illustrated campaign monetary data includes a campaign descriptor 760, a campaign status 761 (e.g., expired or active), a campaign expiration data 762, a campaign budget 763, current campaign spending 764, remaining campaign budget 766, campaign pacing 767 (e.g., percentage of campaign budget already spent), and campaign data download 768, which provides ad campaign data in a format such as CSV (comma separated variables).

IX. Computing Machine Architecture

Figure 8:
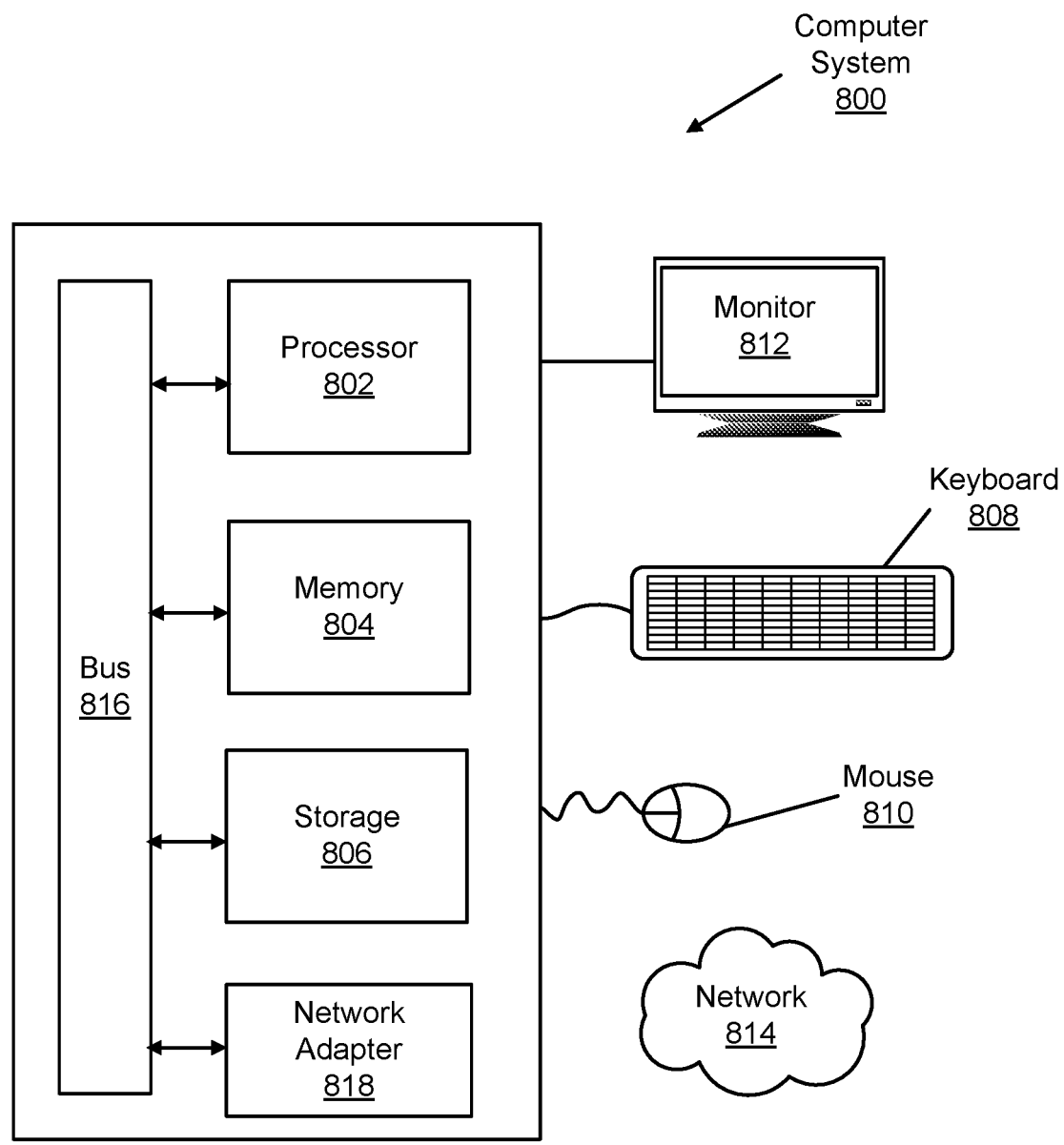
FIG. 8 illustrates a block diagram illustrating components of an example machine able to read instructions from a machine-readable medium and execute them in a processor (or controller), according to one embodiment.

FIG. 8 is a block diagram illustrating components of an example machine for implementing messaging platform 100. Such a machine is able to read instructions from a machine-readable medium and execute them in a processor (or controller), according to one embodiment. Specifically, FIG. 8 shows a diagrammatic representation of a machine in the example form of a computer system 800 within which instructions (e.g., software) for causing the machine to perform any one or more of the methodologies discussed herein may be executed. In alternative embodiments, the machine operates as a standalone device (e.g., a computer service) or may be connected (e.g., networked) to other machines (e.g., including multiple computer servers networked together). In a networked deployment, the machine may operate in the capacity of a server machine or a client machine in a server-client network environment, or as a peer machine in a peer-to-peer (or distributed) network environment.

The machine is generally a server computer, though it may also be a client computer, a personal computer (PC), a tablet PC, a set-top box (STB), a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute instructions to perform any one or more of the methodologies discussed herein.

The example computer system 800 includes a processor 802 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 804, and a static memory (or storage) 806, which are configured to communicate with each other via a bus 816. The computer system 800 may further include graphics display unit (or monitor) 812 (e.g., a plasma display panel (PDP), a liquid crystal display (LCD), a projector, or a cathode ray tube (CRT)). The computer system 800 may also include alphanumeric input device 808 (e.g., a keyboard), a cursor control device 810 (e.g., a mouse, a trackball, a joystick, a motion sensor, or other pointing instrument), and a network interface device 818 (e.g., a network adaptor), which also are configured to communicate via the bus 816.

The storage 806 includes a machine-readable medium on which are stored instructions embodying any one or more of the methodologies or functions described herein. The instructions (e.g., software) may also reside, completely or at least partially, within the main memory 804 or within the processor 802 (e.g., within a processor's cache memory) during execution thereof by the computer system 800, the main memory 804 and the processor 802 also constituting machine-readable media. The instructions may be transmitted or received over a network 814 via the network interface device 818.

While machine-readable medium is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium that is capable of storing instructions for execution by the machine and that cause the machine to perform any one or more of the methodologies disclosed herein. The term "machine-readable medium" includes, but not be limited to, data repositories in the form of solid-state memories, optical media, and magnetic media.

X. Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein. In one or more embodiments, each of the aforementioned modules of the messaging platform 100 can be implemented as a software application or a set of related software applications executing on one or more hardware devices (eg, a server or cluster).

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 802, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm) In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for ad promotion in a real-time messaging platform through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A computer-implemented method comprising:
  receiving, by a computing system, from a computing device accessing a social media platform through a first account, a request for a message stream, wherein the social media platform is accessible by a plurality of accounts including the first account;
  retrieving, from a message repository of the social media platform, a set of two or more candidate messages;
  calculating a respective fatigue score for each candidate message, wherein calculating the fatigue score for a candidate message comprises:
    accessing a fatigue map that relates one or more accounts and messages viewed in one or more message streams by respective users of the one or more accounts, to retrieve information of one or more first messages associated with the candidate message, the one or more first messages having been previously presented to the first account, wherein entries of the fatigue map for the first account include timestamps identifying when respective first messages were viewed or interacted with by a user of the first account, and
    calculating the fatigue score for the candidate message as a function of the timestamps for the first messages and one or more fatigue factors assigned to each first message, wherein each fatigue factor for a respective first message is a weighting factor assigned based on a presentation format of the first message or a type of interaction by the user of the first account with the first message;
  removing, based on the respective fatigue scores, one or more candidate messages from the set of two or more candidate messages to derive a subset of one or more candidate messages, wherein each removed candidate message corresponds to one or more respective first messages having respective fatigue scores that exceed a specified threshold score;
  for each candidate message in the subset of one or more candidate messages, computing a likelihood value that represents a likelihood of engagement with the respective candidate message by a user of the first account;
  selecting, based on the likelihood values, one of the candidate messages in the subset of one or more candidate messages and inserting the selected candidate message into the message stream; and
  sending the message stream to the computing device for display.

2. The method of claim 1, wherein computing the likelihood value for each candidate message in the subset of one or more candidate messages comprises:
  computing, based on one or more temporal features of the respective candidate message, a message weight for the respective candidate message;
  computing, based on one or more temporal features of the first account, an account weight for the respective candidate message; and
  computing the likelihood value that represents the likelihood of engagement with the respective candidate message by the user of the first account based on the message weight and the account weight for the respective candidate message.

3. The method of claim 2, further comprising determining the one or more temporal features of the first account based on the fatigue map.

4. The method of claim 1, wherein for the first account, the fatigue map includes a respective pointer to impression data for each message of the one or more first messages.

5. The method of claim 4, wherein the impression data comprises one or more of an impression stored in an impression repository or an engagement stored in an engagement repository.

6. The method of claim 1, wherein a respective fatigue score is calculated for each candidate message based on a weighted combination of exponential decay factors, each exponential decay factor representing a time elapsed since a respective timestamp of a respective first message associated with the candidate message.

7. The method of claim 6, wherein the respective fatigue score is calculated for each candidate message based on a weighted combination of a plurality of interactions between the first account and the first messages associated with the candidate message over a particular period of time.

8. The method of claim 1, further comprising:
  determining, for each candidate message, a respective cross feature associated with the candidate message and the first account, the respective cross feature representing potential interest of the first account, or a relationship or a history of the first account with the candidate message,
  wherein the likelihood value for each candidate message is calculated based on the respective cross feature of the candidate message with respect to the first account.

9. The method of claim 8, wherein each cross feature is a temporal feature determined based on the fatigue map.

10. The method of claim 1, wherein the one or more first messages were previously presented to the first account over a particular period of time.

11. The method of claim 1, wherein a type of interaction of the first account with a first message is selected from a group of impression types consisting of: an impression, a positive engagement, a negative engagement, a monetizable engagement, and a performance engagement.

12. The method of claim 1, wherein each of the one or more first messages is associated with the candidate message by at least one of (i) being authored by a same account of the social media platform that authored the candidate message or (ii) sharing a subject matter included in the candidate message.

13. The method of claim 1, wherein a first message of the one or more first messages has the same content as the candidate message.

14. The method of claim 1, further comprising:
  determining that a sum of fatigue scores of all candidate messages in the set of one or more candidate messages that were authored by a second account of the social media platform exceeds a specified threshold value, and in response:
  removing all candidate messages authored by the second account from the subset of one or more candidate messages.
15. The method of claim 1, further comprising:
determining that a sum of fatigue scores of all candidate messages in the set of one or more candidate messages that share a first subject matter exceeds a predetermined threshold value, and in response:
  removing all candidate messages that contain the first subject matter from the subset of one or more candidate messages.
16. The method of claim 1, further comprising:
determining that a sum of the fatigue scores of all candidate messages in the set of two or more candidate messages exceeds a predetermined threshold value, and in response:
  removing all candidate messages from the set of two of more candidate messages.
17. A non-transitory computer-readable storage medium comprising instructions executable by a processor, the instructions when executed causing the processor to:
  receive, from a computing device accessing a social media platform through a first account, a request for a message stream, wherein the social media platform is accessible by a plurality of accounts including the first account;
  retrieve, from a message repository of the social media platform, a set of two or more candidate messages;
  calculate a respective fatigue score for each candidate message, wherein calculating the fatigue score for a candidate message comprises:
    access a fatigue map that relates one or more accounts and messages viewed in one or more message streams by respective users of the one or more accounts, to retrieve information of one or more first messages associated with the candidate message, the one or more first messages having been previously presented to the first account, wherein entries of the fatigue map for the first account include timestamps identifying when respective first messages were viewed or interacted with by a user of the first account, and
    calculate the fatigue score for the candidate message as a function of the timestamps for the first messages and one or more fatigue factors assigned to each first message, wherein each fatigue factor for a respective first message is a weighting factor assigned based on a presentation format of the first message or a type of interaction by the user of the first account with the first message;
  remove, based on the respective fatigue scores, one or more candidate messages from the set of two or more candidate messages to derive a subset of one or more candidate messages, wherein each removed candidate message corresponds to one or more respective first messages having respective fatigue scores that exceed a specified threshold score;
  for each candidate message in the subset of one or more candidate messages, compute a likelihood value that represents a likelihood of engagement with the respective candidate message by a user of the first account;
  select, based on the likelihood values, one of the candidate messages in the subset of one or more candidate messages and inserting the selected candidate message into the message stream; and
  send the message stream to the computing device for display.
18. The non-transitory computer-readable storage medium of claim 17, wherein the instructions that cause the processor to compute the likelihood values comprise instructions that, when executed, cause the processor to, for each candidate message in the subset of one or more candidate messages:
  compute, based on one or more temporal features of the respective candidate message, a message weight for the respective candidate message;
  compute, based on one or more temporal features of the first account, an account weight for the respective candidate message; and
  compute the likelihood value that represents the likelihood of engagement with the respective candidate message by the user of the first account based on the message weight and the account weight for the respective candidate message.
19. The non-transitory computer-readable storage medium of claim 18, further comprising instructions that, when executed, cause the processor to:
  determine the one or more temporal features of the first account based on either the fatigue map or timestamps of activities of the first account over a particular time period.
20. The non-transitory computer-readable storage medium of claim 17, wherein for the first account, the fatigue map includes the fatigue map a respective pointer to impression data for each message of the one or more first messages.
21. The non-transitory computer-readable storage medium of claim 20, wherein the impression data comprises one or more of an impression stored in an impression repository or an engagement stored in an engagement repository.
22. The non-transitory computer-readable storage medium of claim 17,
  wherein a respective fatigue score is calculated for each candidate message based on a weighted combination of exponential decay factors, each exponential decay factor representing a time elapsed since a respective timestamp of a respective first message associated with the candidate message,
  wherein the fatigue score is calculated for each candidate message based on a weighted combination of a plurality of interactions between the first account and the first messages associated with the candidate message over a particular period of time.
23. The non-transitory computer-readable storage medium of claim 17, further comprising instructions that, when executed, cause the processor to:
  determine, for each candidate message, a respective cross feature associated with the candidate message and the first account, the respective cross feature representing potential interest of the first account, or a relationship or a history of the first account with the candidate message,
  wherein the likelihood value for each candidate message is calculated based on the respective cross feature of the candidate message with respect to the first account.
24. A system comprising:
  a processor; and a non-transitory computer-readable storage medium comprising instructions executable by the processor, the instructions when executed causing the processor to:
  receive, from a computing device accessing a social media platform through a first account, a request for a message stream, wherein the social media platform is accessible by a plurality of accounts including the first account;
  retrieve, from a message repository of the social media platform, a set of two or more candidate messages;
  calculate a respective fatigue score for each candidate message, wherein calculating the fatigue score for a candidate message comprises:
    access a fatigue map that relates one or more accounts and messages viewed in one or more message streams by respective users of the one or more accounts, to retrieve information of one or more first messages associated with the candidate message, the one or more first messages having been previously presented to the first account, wherein entries of the fatigue map for the first account include timestamps identifying when respective first messages were viewed or interacted with by a user of the first account, and
    calculate the fatigue score for the candidate message as a function of the timestamps for the first messages and one or more fatigue factors assigned to each first message, wherein each fatigue factor for a respective first message is a weighting factor assigned based on a presentation format of the first message or a type of interaction by the user of the first account with the first message;
  remove, based on the respective fatigue scores, one or more candidate messages from the set of two or more candidate messages to derive a subset of one or more candidate messages, wherein each removed candidate message corresponds to one or more respective first messages having respective fatigue scores that exceed a specified threshold score;
  for each candidate message in the subset of one or more candidate messages, compute a likelihood value that represents a likelihood of engagement with the respective candidate message by a user of the first account;
  select, based on the likelihood values, one of the candidate messages in the subset of one or more candidate messages and inserting the selected candidate message into the message stream; and
  send the message stream to the computing device for display.

25. The system of claim 24, wherein the instructions that cause the processor to compute the likelihood values comprise instructions that, when executed, cause the processor to, for each candidate message in the subset of one or more candidate messages:
  compute, based on one or more temporal features of the respective candidate message, a message weight for the respective candidate message;
  compute, based on one or more temporal features of the first account, an account weight for the respective candidate message; and
  compute the likelihood value that represents the likelihood of engagement with the respective candidate message by the user of the first account based on the message weight and the account weight for the respective candidate message.

26. The system of claim 25, further comprising instructions that, when executed, cause the processor to:
  determine the one or more temporal features of the first account based on either the fatigue map or timestamps of activities of the first account over a particular time period.

27. The system of claim 24, wherein for the first account, the fatigue map includes a respective pointer to impression data for each message of the one or more first messages.

28. The system of claim 27, wherein the impression data comprises one or more of an impression stored in an impression repository or an engagement stored in an engagement repository.

29. The system of claim 24,
  wherein a respective fatigue score is calculated for each candidate message based on a weighted combination of exponential decay factors, each exponential decay factor based on time elapsed since a respective timestamp of a respective first message associated with the candidate message,
  wherein the respective fatigue score is calculated for the candidate message based on a weighted combination of a plurality of interactions between the first account and the first messages associated with the candidate message over a particular period of time.

30. The system of claim 24, further comprising instructions that, when executed, cause the processor to:
  determine, for each candidate message, a respective cross feature associated with the candidate message and the first account, the respective cross feature representing potential interest of the first account, or a relationship or a history of the first account with the candidate message,
  wherein the likelihood value for each candidate message is calculated based on the respective cross feature of the candidate message with respect to the first account.

* * * * *

UNITED STATES PATENT AND TRADEMARK OFFICE
CERTIFICATE OF CORRECTION

| | | |
|---|---|---|
| PATENT NO. | : 10,769,677 B1 | Page 1 of 1 |
| APPLICATION NO. | : 15/894550 | |
| DATED | : September 8, 2020 | |
| INVENTOR(S) | : Parag Agrawal et al. | |

It is certified that error appears in the above-identified patent and that said Letters Patent is hereby corrected as shown below:

On the Title Page

Column 1, item (63), (Related U.S. Application Data), Line 1, delete "15/259,927," and insert -- 15/259,924, --, therefor.

Page 2, Column 1, item (63), (Related U.S. Application Data), Line 4, delete "and a" and insert -- which is a --, therefor.

In the Claims

Column 54, Line 32, delete "includes the fatigue map a respective pointer" and insert -- includes a respective pointer --, therefor.

Signed and Sealed this
Twenty-fourth Day of November, 2020

Andrei Iancu
*Director of the United States Patent and Trademark Office*